(12) United States Patent
Thomlinson et al.

(10) Patent No.: US 6,532,542 B1
(45) Date of Patent: Mar. 11, 2003

(54) PROTECTED STORAGE OF CORE DATA SECRETS

(75) Inventors: Matthew W. Thomlinson, Bellevue, WA (US); Scott Field, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/978,215

(22) Filed: Nov. 25, 1997

Related U.S. Application Data

(63) Continuation of application No. 08/884,864, filed on Jun. 30, 1997.

(51) Int. Cl.[7] .......................... G06F 11/30; G06F 12/14; H04L 9/00
(52) U.S. Cl. ........................ 713/187; 713/167
(58) Field of Search .............................. 380/4, 23, 25, 380/49

(56) References Cited

U.S. PATENT DOCUMENTS

| | | | | |
|---|---|---|---|---|
| 4,933,969 A | * | 6/1990 | Marshall et al. | 380/25 |
| 5,457,746 A | * | 10/1995 | Dolphin | 380/4 |
| 5,495,533 A | * | 2/1996 | Linehan et al. | 380/21 |
| 5,509,074 A | * | 4/1996 | Choudhurry et al. | 380/23 |
| 5,530,758 A | * | 6/1996 | Marino et al. | 380/49 |
| 5,555,304 A | * | 9/1996 | Hasebe et al. | 380/4 |
| 5,757,914 A | * | 5/1998 | McMauis | 380/23 |
| 5,757,915 A | * | 5/1998 | Aucsmith et al. | 713/187 |
| 5,778,070 A | * | 7/1998 | Mattison | 380/25 |
| 5,884,986 A | * | 12/1998 | Davis | 380/4 |
| 5,870,477 A | * | 2/1999 | Sasaki et al. | 380/25 |
| 5,917,912 A | * | 6/1999 | Ginter et al. | 380/24 |

* cited by examiner

*Primary Examiner*—Eric W. Stamber
*Assistant Examiner*—James W. Myhre
(74) *Attorney, Agent, or Firm*—Lee & Hayes, PLLC

(57) ABSTRACT

The invention provides central storage for core data secrets, referred to as data items. The architecture includes a storage server, a plurality of installable storage providers, and one or more authentication providers. Programming interfaces are exposed so that application programs can utilize the services provided by the invention without having to actually implement the features. When storing a data item using the protected storage services, an application program can specify rules that determine when to allow access to the data item. Access can be limited to specified application programs, to certain classes of application programs, or to application program having certain properties. Such properties for a particular application might include, for example, the publisher of the application and/or the name of the application. These properties might also include properties specified by an authentication certificate associated with the application program.

53 Claims, 3 Drawing Sheets

PROTECTED STORAGE OF CORE DATA SECRETS

RELATED APPLICATIONS

This application is a continuation of a U.S. patent application entitled "Protected Storage of Core Data Secrets"; Ser. No. 08/884,864; by inventors Matthew W. Thomlinson, Scott Field, and Allan Cooper; filed Jun. 30, 1997.

TECHNICAL FIELD

This invention relates to systems and methods that provide central services for securely storing core data secrets such as passwords, cryptographic keys, and sensitive personal or financial codes.

BACKGROUND OF THE INVENTION

Increasingly, financial and other sensitive transactions are being performed by personal computers. This has increased the need for secure storage of data. Modem cryptography techniques are often used to protect such data from unauthorized access.

New security methods, however, have brought about a need to store and protect "core" data secrets, such as private cryptographic keys, credit card numbers, and other small pieces of secret data. Presently, this responsibility is left to individual application programs or to personal computer users themselves. Although programs are available that allow users to encrypt and store data, such programs cannot typically be used by other application programs. Currently, each application program has to devise a safe and secure method to store such data.

As an example of the problems associated with the current state of the art, consider the issues involved in exploiting smart card technologies. A smart card is particularly well suited as a receptacle for core data secrets such as those described above. In addition, smart cards can be used to authenticate users by requiring each user to insert his or her personal smart card into a receptacle associated with the user's personal computer. Tamper-proof smart cards have been designed for just these purposes.

Problems arise without agreed-upon standards for using such devices. Although a developer could provide capabilities for working with a limited number of smart cards, it would be difficult or impossible to anticipate all the different variations that might eventually arise. This fact makes it impractical to implement smart card technology in various different applications.

Although some storage media such as magnetic hard disks do not present the challenges of smart cards, many software developers simply do not have the background and knowledge required to safely implement modem cryptographic techniques. Even if they did, it would be inefficient for each developer to undertake the complex task of developing a method of storing core secrets. Furthermore, resulting solutions would be incompatible. It would be much more preferable to adopt a common scheme for storing such data, and to avoid having to implement a new solution for every different application program.

SUMMARY OF THE INVENTION

The invention described below provides central protected storage services that can be called by application programs to store core secrets. An embodiment of the invention is implemented as a server process and associated interfaces that can be invoked by application programs to store and retrieve small data items.

The general method and architecture includes a storage server and a plurality of installable storage providers and authentication providers. Each storage provider is adapted to securely store data using a specific type of media, such as magnetic media or smart cards. Details of the storage medium are hidden from the calling application programs. Authentication providers are used to authenticate users by different methods, such as by requesting passwords, by reading smart cards, by retinal scans, or by other ways that might be devised in the future. Again, authentication details are generally hidden from the calling application programs.

Application programs interact with the storage server through well-defined interfaces. A data item can be stored with a simple call to the storage server, and can be retrieved later with a similar call. All encryption, decryption, item integrity checks, and user authentication are performed by the storage server and its associated providers. Because of this, application programs can take advantage of advanced security features without adding complexity to the application programs themselves.

When storing a data item using the protected storage services, an application program can specify rules that determine when to allow access to the data item. Access is generally limited to the computer user that created the data item. Access can similarly be limited to specified application programs or to certain classes of application programs. The storage server authenticates requesting application programs before returning data to them.

A default authentication provider authenticates users based on their computer or network logon. Other authentication providers can also be installed.

A default storage provider allows storage of data items on magnetic media such as a hard disk or a floppy disk. Data items are encrypted before they are stored. The encryption uses a key that is derived from the authentication of the user. Specifically, the key is derived from the user's password, supplied during computer or network logon. In addition, an application program or the user can specify that certain items require an additional password to be entered whenever access to the data is requested.

The default storage provider implements a multi-level key encryption scheme to minimize the amount of encryption that has to be re-done when the user changes a password. Each data item is encrypted using an item key that is generated randomly by the system. The item key is in turn encrypted with a master key that is itself encrypted (as described below) with a key derived from the user-supplied password (such as the user's logon password).

APPENDIX

Figure 1:
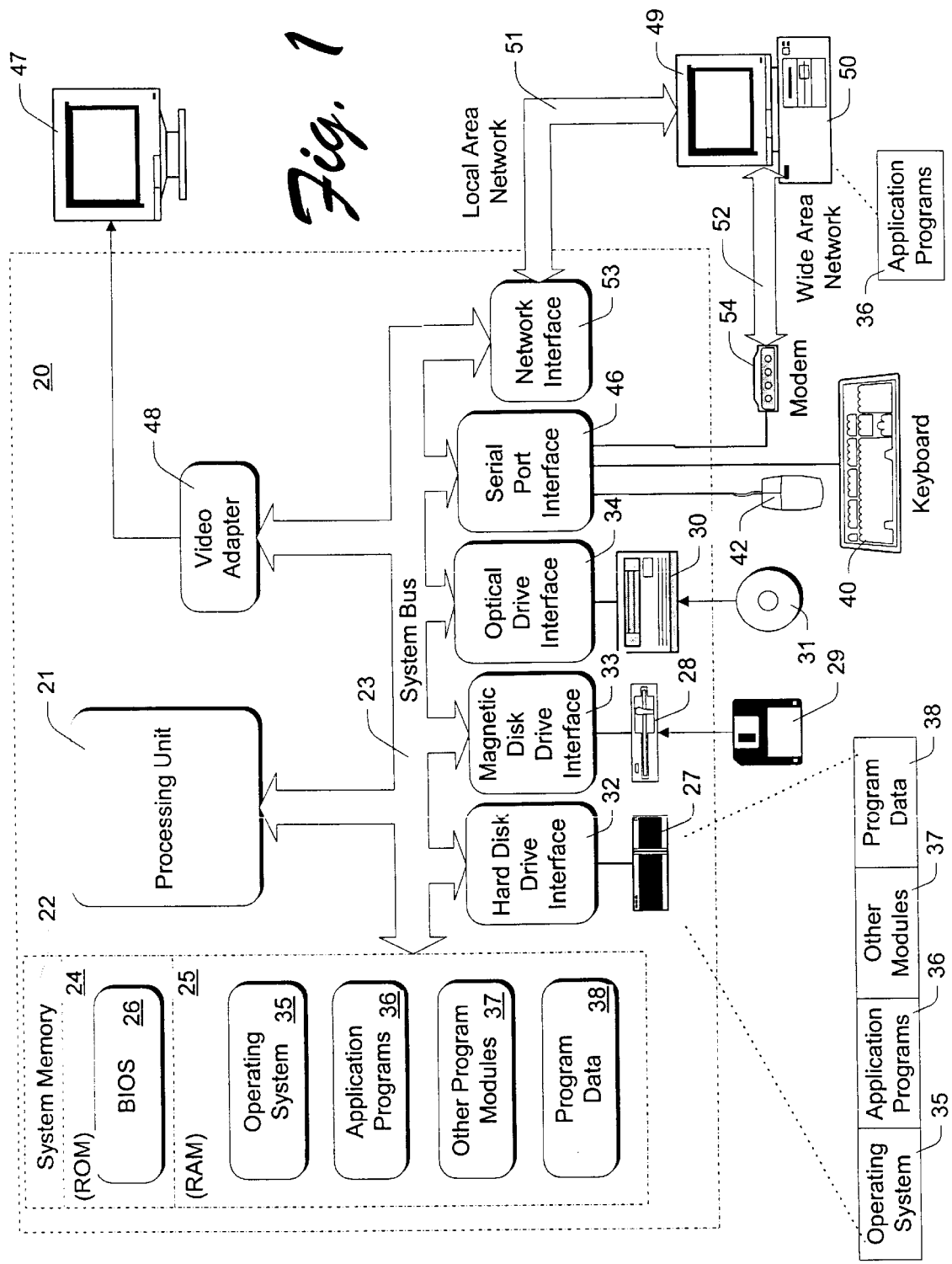
FIG. 1 is a block diagram of an exemplary computer system suitable for use in implementing the invention.

The attached Appendix, which forms part of the specification, describes interfaces and functions implemented in the described embodiment of the invention.

DETAILED DESCRIPTION

Cryptopraphy Overview

In general, cryptography is the process for encrypting or scrambling messages such that the messages can be stored and transmitted securely. Cryptography can be used to achieve secure communications, even when the transmission media (for example, the Internet) is untrustworthy. Computer users also use cryptography to encrypt sensitive files, so that an intruder cannot understand them. Cryptography can be used to ensure data integrity as well as to maintain secrecy. It is also possible to verify the origin of data items using cryptography, though the use of using digital signatures. When using cryptographic methods, only the cryptographic keys must remain secret. The algorithms, the key sizes, and file formats can be made public without compromising security.

Using data encryption, a data item can be scrambled so that it appears like random gibberish and is very difficult to transform back to the original data without a secret key. This message can consist of ASCII text, a database file, or any other data.

Once a data item has been encrypted, it can be stored on non-secure media or transmitted over a non-secure network, and still remain secret. Later, the message can be decrypted into its original form.

When a data item is encrypted, an encryption key is used. This is comparable to a key that is used to lock a padlock. To decrypt the message, a decryption key must be used. The encryption and decryption keys are often, but not always, the same key.

There are two main classes of encryption algorithms: symmetric algorithms and public-key algorithms (also known as asymmetric algorithms). Systems that use symmetric algorithms are sometimes referred to as conventional.

Symmetric algorithms are the most common type of encryption algorithm. They are known as symmetric because the same key is used for both encryption and decryption. Unlike the keys used with public-key algorithms, symmetric keys are frequently changed.

Compared to public-key algorithms, symmetric algorithms are very fast and, thus, are preferred when encrypting large amounts of data. Some of the more common symmetric algorithms are RC2, RC4, and the Data Encryption Standard (DES).

Public-key (asymmetric) algorithms use two different keys: the public key and the private key. The private key is kept private to the owner of the key pair, and the public key can be distributed to anyone who requests it (often by means of a certificate). If one key is used to encrypt a message, then the other key is required to decrypt the message.

Public-key algorithms are very slow—on the order of 1,000 times slower than symmetric algorithms. Consequently, they are typically used only to encrypt session keys. They are also used to digitally sign messages.

One of the most common public-key algorithms is the RSA Public-Key Cipher.

Digital signatures can be used to distribute an unencrypted data item, while allowing the recipients to be able to verify that the message comes from its purported sender and that it has not been tampered with. Signing a message does not alter the message, it simply generates a digital signature string that can either be bundled with the message or transmitted separately.

Digital signatures are generated by using public-key signature algorithms: a private key is used to generate the signature, and the corresponding public key is used to validate the signature.

Authentication involves the process of verifying the identity of a person or entity. Certificates are a common way to achieve authentication. A certificate is a set of data that completely identifies an entity, and is issued by a Certification Authority (CA) only after that Authority has verified that the entity is who it says it is. The data set includes the entity's public cryptographic key. When the sender of a message signs data with its private key (and sends a copy of its certificate with the message), the recipient of the message can use the sender's public key (retrieved from the certificate) to verify that the sender is who it says it is. Certificates can also be used to verify that data (including application programs) have been vouched for by a trusted source.

On a network, there is often a trusted application running on a secure computer that is known as the Certification Authority. This application knows the public key of each user. Certification Authorities dispense messages known as certificates, each of which contains the public key of one of its client users. Each certificate is signed with the private key of the Certification Authority.

The invention described below utilizes techniques such as the well-known digital encryption, signing, and authentication techniques described above. For further information regarding such techniques, refer to Schneier, Bruce; *Applied Cryptography Second Edition: Protocols, Algorithms, and Source Code in C;* John Wiley & Sons, 1996, which is hereby incorporated by reference. The following discussion assumes general familiarity with these topics.

Exemplary Operating Environment

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by remote processing devices that are linked through a communications network. In a distributed computer environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs) read only memories (ROM), and the like, may also be used in the exemplary operating environment.

A number of program modules may be stored on the hard disk, magnetic disk 29 optical disk 31, ROM 24, or RAM 25, including an operating system 35, one or more application programs 36, other program modules 37, and program data 38. A user may enter commands and information into the personal computer 20 through input devices such as keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, personal computers typically include other peripheral output devices (not shown) such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The illustrated computer uses an operating system such as the Windows family of operating systems available from Microsoft Corporation. The functionality described below is implemented using standard programming techniques, including the use of OLE and COM interfaces such as described in Brockschmidt, Kraig; *Inside OLE* 2; Microsoft Press, 1994, which is hereby incorporated by reference.

More recent Windows operating systems utilize what is referred to as the Win32 API: a well-defined set of interfaces that allow application programs to utilize functionality provided by the Windows operating systems. The Win32 API is documented in numerous texts, including Simon, Richard; *Windows 95 Win32 Programming API Bible;* Waite Group Press, 1996, which is hereby incorporated by reference. General familiarity with this type of programming is assumed throughout the following discussion.

Overall Functionality and Architecture

Figure 2:
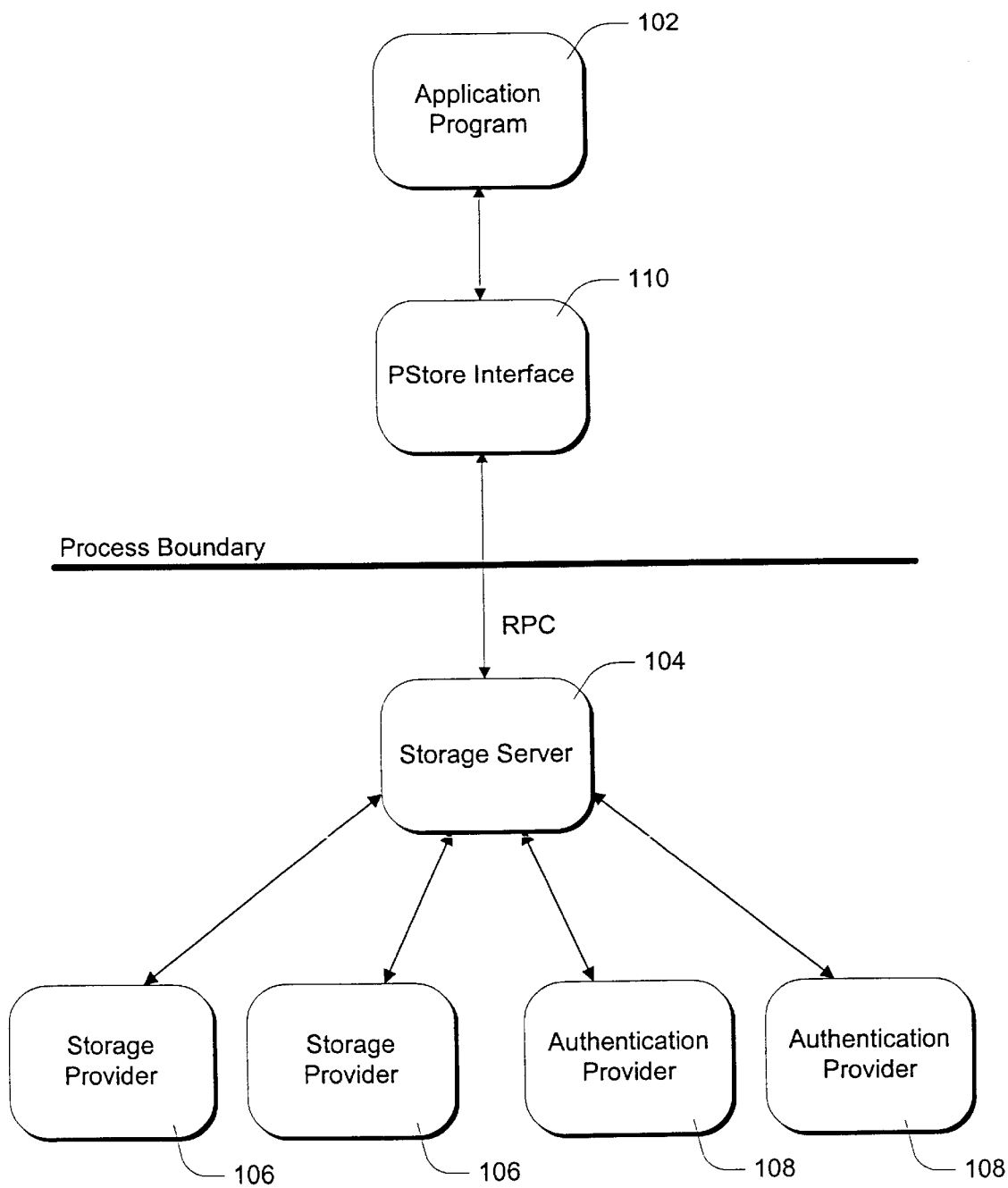
FIG. 2 is a block diagram of a protected storage system and a calling application program in accordance with the invention.

FIG. 2 shows architectural components of a protected storage system in accordance with the invention for storing data items and for protecting them from unauthorized access. The protected storage system allows application programs to securely store data items that must be kept private and free from tampering. Such data items might include cryptographic keys, passwords, financial information, trust profiles, etc. The storage system is designed to hold small items of core secret data in a central and common storage location; if a lot of data is to be protected, a bootstrap secret (such as an encryption key) may be stored in the storage system rather than the data itself. This enables data items to be moved when appropriate to small, secure hardware devices such as smart cards, and also avoids unnecessary overhead which would otherwise be required to secure large data items.

The protected storage system is executed by a computer such as described above with reference to FIG. 1. Application programs, such as application program 102 shown in FIG. 2, are also executed by the computer.

Storage system 100 includes a storage server component 104, also referred to as a dispatcher. Generally, the storage server, through the Pstore interface 110, receives data items from application programs, securely stores the data items, and returns such data items in response to requests from application programs. The storage server also performs authentication and verification procedures with respect to the requesting application programs, as will be explained in more detail below.

Associated with the storage server are a plurality of installable storage providers 106 and a plurality of installable authentication providers 108. Specified storage providers are called by the storage server to securely store and retrieve data items. One or more authentication providers are called by the storage server to identify and/or authenticate current computer users.

A default storage provider is implemented within the storage system. The default storage provider encrypts data items and then stores them on a hard disk or floppy disk. The encryption is based on one or more keys that are derived from authentication of the current computer user. The default storage provider also verifies the integrity of data items when retrieving and decrypting them.

A default authentication provider is also implemented within the storage system. The default authentication provider is called by the storage server to identify current computer users based on previously completed operating system logon procedures. Specifically, the default authentication provider identifies the current computer user based on the logon identification and password provided by the user while logging on to the computer's operating system or to a network operating system.

Although default storage and authentication providers are implemented, additional providers can be installed in the future to take advantage of new storage and authentication technologies. For example, a smart card storage provider might be installed to allow storage of core data items on a smart card. A smart card authentication provider might similarly be provided to authenticate users by requiring them to insert their smart cards into a smart card reader. In either case, the smart card could utilize public-key cryptographic techniques.

Well-defined COM interfaces are used between the storage server and the various providers, allowing new providers to be easily installed and registered with the storage server. Application programs are able to make the same calls to storage server 102 regardless of which providers are used. Because of this, application programs can be written to take advantage of future technologies by simply interacting with storage server 102, and without having to concern themselves with the details of such future technologies.

To increase security, the protected storage system is implemented in a different address space than the calling application programs. Communications across the process or address space boundary take place using remote procedure calls (RPCs). Such calls can be made when operating under Windows operating systems and other operating systems. The functionality and formatting of RPC calls is documented in the Microsoft Win32 Software Development Kit.

Although application programs can make RPC calls directly, this complexity is avoided by providing a dynamically linked library (DLL) that can be executed in the application programs' address spaces. This library, referred to as Pstore Interface 110 in FIG. 2, implements a plurality of interfaces and associated methods that can be called by the application programs to exploit the full functionality of the protected storage system. The interfaces include methods for creating and reading data items, as well as other useful functions as described in the Protected Storage Functions, Protected Storage Interfaces, and Protected Storage Data Structures sections of this document. The interfaces and methods in the described embodiment are implemented using the COM (component object model) interfaces of the Windows operating system.

Protected-Data Access Control

The protected storage system described herein has powerful data access control capability. The storage system offers two levels of data protection: application-level protection and user-level protection. At the application level, the storage server returns requested data items only to authorized requesting application programs. Furthermore, the storage server authenticates requesting application programs before returning individual data items. Application program authentication refers to a process of determining whether an application program has been tampered with, or to an alternative process of verifying a program's trustworthiness through use of public/private key cryptographic digital signatures or other means. Microsoft Authenticode is an available mechanism for verifying, through the use of digital signatures, that an application program has been published by a specified person, group, or organization, and that it is therefore trustworthy. Authenticode functionality is publicly available from Microsoft Corporation as part of its Win32 Software Development Kit.

In the embodiment describe herein, data items are organized in a hierarchical fashion by specifying types and subtypes as follows:

Type-Subtype-Data Item

There are predefined types and subtypes, and application programs can create new types and subtypes. Different protection levels can be established for data items falling under certain types and subtypes. Specifically, an access rule set is specified for each subtype. An access rule set contains rules for different types or subtypes of data items. Access to a data item of a particular subtype is granted if any single rule of the corresponding rule set is satisfied. Each access rule comprises a mode and one or more access clauses; all of the access clauses must be satisfied before the rule is considered satisfied. The mode indicates the type of access allowed if all the clauses in a rule are satisfied. Currently, there are two access modes defined: read and write access.

There are currently three types of access clauses: Authenticode, Binary Check, and Security Descriptor. Authenticode verifies the application program requesting access to the protected data is trusted and can optionally determine whether the originator, and thus the originator's application, can be trusted. Binary Check ensures that a program has not been tampered with since installation. The Security Descriptor clause provides access based on Windows NT access control lists (ACLs).

Authenticode is a well-documented product and service available from Microsoft Corporation. It involves the use of authentication certificates that are distributed with application programs. Each certificate specifies several properties relating to the program, including the publisher of the program, the name of the program, the issuer of the certificate, and the root authority responsible for authentication of the certificate itself. This information is signed using public key cryptography so that all of the information can be verified. Other types of authentication certificates might specify additional or different program properties.

If the Authenticode clause was specified at the time of subtype creation, a check is made to see if the requesting application was signed or not, and if signed, by whom. The Authenticode clause may specify a particular root, certificate issuer, publisher (signer), program name, or some combination of the foregoing. Access will not be granted unless the specified criteria are met. If no criteria are specified, the verification amounts to allowing any Authenticode-verified application or module access to the data. Authenticode checking also verifies the binary image of the module under inspection.

The Binary Check is implemented by taking a hash of a binary image of an application program at initialization. When the application program asks for data at a later time, the storage system again takes a hash of the memory image and compares it to the original hash. The two hashes must match before the protected storage system will allow the application program to access requested data. Thus, if the application has changed since it was installed, and therefore is likely to have been tampered with, the data will be protected and access to the data by the application will be denied.

Thus, the storage server, in response to requests for data items from application programs, evaluates one or more designated properties of the application programs. The storage server returns requested data items only to those application programs whose evaluated properties have designated or predetermined values. The properties relate to characteristics of the application programs themselves, rather than to characteristics of any particular process that is executing the application program. In the embodiment described herein, the properties include those specified in an authentication certificate, such as a program publisher property, a program name property, a certificate issuer property, and a certificate root property. Such properties also include a binary hash value of the binary image of an application program. Other properties might also be evaluated. Such other properties might include the location of the application program on a hard disk, whether its archive bit is set, the date and time it was last saved or modified, its size, etc.

The Security Descriptor clause is intended to allow access only to specified users or groups, and is enforced on Windows NT platforms. This clause gets the necessary information about the users and groups from the ACLs contained in the Windows NT security descriptor.

At the user level, the storage server allows access to individual data items depending on the current computer user; by default, only the user responsible for creating the data item is allowed to access it. However, a user can override this default behavior by specifying appropriate options when creating and saving data items, or the user can later modify access rights to the data.

Users and application programs can specify security styles, which specify a degree and/or type of confirmation or authentication is required to access a particular data item; for instance, whether a password is required. The current embodiment, with the default authentication provider, supports the following access styles:

Silent access: no user interaction required. Authentication is based on a previously completed computer or network operating system authentication procedure. In most cases, this type of authentication relies on the user being able to enter the correct password during a previous logon procedure, and no further interaction is required when protected data is actually accessed.

Logon password: a dialog box is presented requiring the user to enter the password previously used to logon to the computer or network.

User-defined password: the user specifies a password when an item is initially stored, and must enter the password before the data can be accessed again. Such passwords can be different for different data items, or groups of data items can be stored under the same password.

OK/cancel: when an application attempts to access the data, a dialog box appears. The user responds to the dialog box by clicking on an OK or deny button, thereby granting/denying access to the data by a requesting application program.

As is apparent from the different types of access styles, accessing items in protected storage may require user interaction. This interaction is implemented through the use of a user alert dialog box. Typically, the user will be required to enter a password in response to a user alert dialog box. However, different authentication providers might require different types of responses (such as physical insertion of a hardware token or biometric authentication procedures).

To prevent attacking programs from presenting similar user alert dialogs, and thereby gaining access to secret data, the user alert dialogs can be customized by the user. Specifically, a user can specify a particular background or digital watermark to be used in the user alert dialog box. Alternatively, such a watermark can be randomly generated for the user. The user will become familiar with whatever watermark has been selected, and will thus recognize unauthorized dialog boxes generated by attacking applications.

Data Encryption, Decryption, and Authentication

Different storage providers may protect stored data in different ways. However, some type of cryptography will usually be employed. The default storage provider described herein uses a password-based encryption scheme, wherein data items are encrypted based on a user-supplied password, or some other code related to user authentication, before storing the data items. When retrieving the data items, decryption is based on the same password or code.

When a data item is protected by the "user-defined password" security style mentioned above, the user explicitly enters a password for each data item during an authentication step that is invoked prior to allowing access to an individual data item. In the case of "silent access," however, encryption and decryption are based on a password or other code that is supplied by the current computer user during a previous computer or network operating system authentication or logon procedure. Typically, a user's logon name and password are used to form or derive a key that is used for encrypting and decrypting data items.

Figure 3:
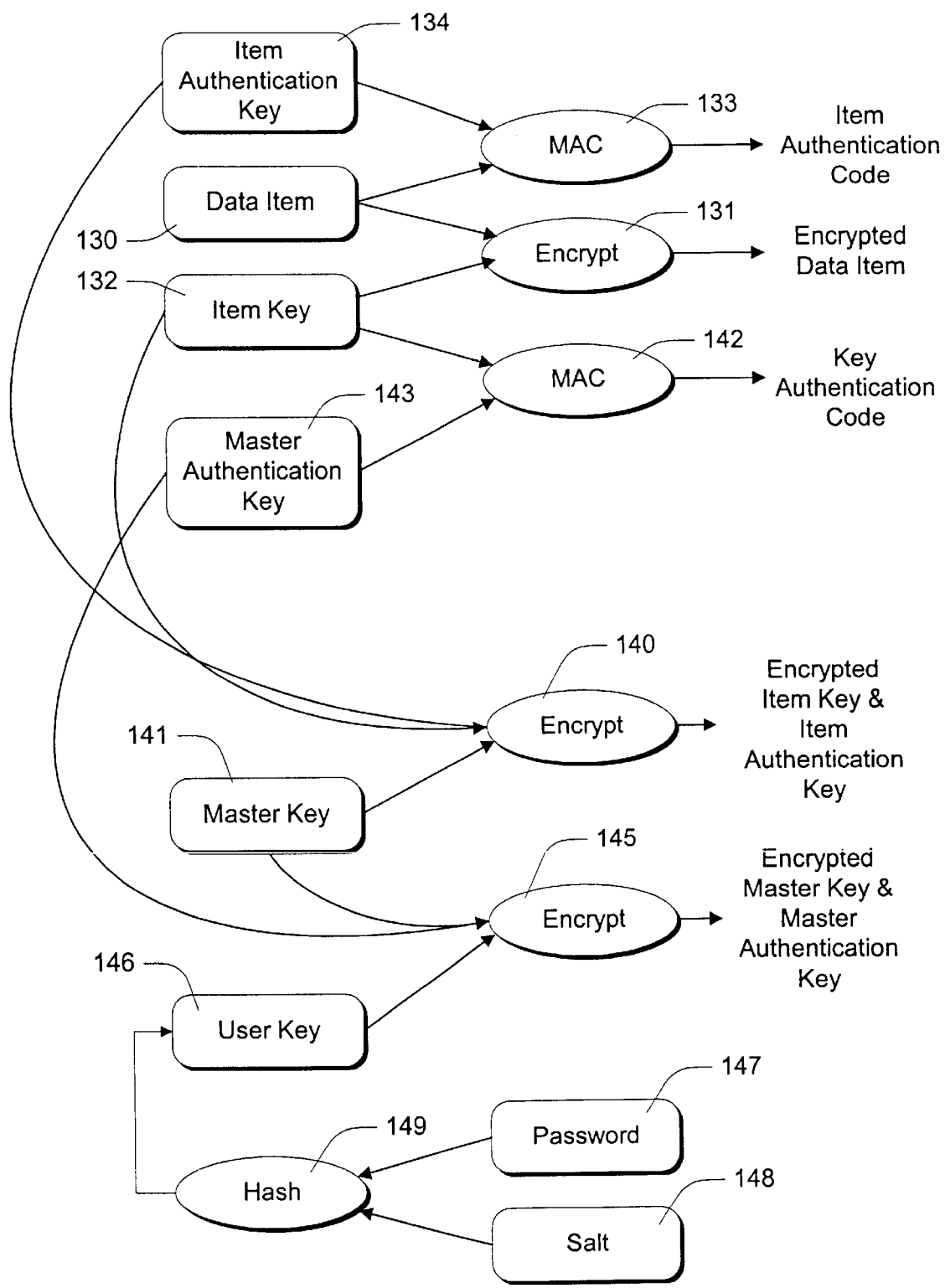
FIG. 3 is a process diagram illustrating how data items are encrypted and authenticated in accordance with the invention.

In the described embodiment, a multi-level key technique is used to encrypt data items based on user-supplied codes or passwords. This technique is illustrated in FIG. 3. In this implementation, encryption and decryption use one or more keys that are derived from the supplied passwords or logon codes. As mentioned, the password or code can either be gathered from a previous authentication step, or the storage system might prompt the current computer user for a password.

Generally, an item key is randomly generated for each data item. The data item is encrypted with its corresponding item key. An item authentication key is also generated randomly for each item and is used to generate an item authentication code. Item authentication codes are used during decryption to verify that data items are decrypted correctly.

The item key and item authentication key are then encrypted using a master key. The master key is a randomly generated number. A master authentication key is also generated and used to calculate a key authentication code so that the correct decryption of the item key and item authentication key can be verified later. Finally, the master key and master authentication key are encrypted using a password that is derived from user authentication or identification.

With reference now to the specific steps of FIG. 3, an individual data item that is to be encrypted and stored is referenced by numeral 130. A step or operation 131 is performed of encrypting data item 130 using an item key 132. Specifically, cryptographic key 132 is used to perform a DES encryption on data item 130. Item key 132 is generated as a random number by the default storage provider.

The storage provider also performs a step 133 of generating an item authentication code for individual data item 130. The item authentication code is generated using a MAC (message authentication code) in conjunction with a randomly generated item authentication key 134. MACs are described in the Schneier text mentioned above.

A further step 140 is performed of encrypting the item key 132 and the item authentication key 134 with a master key 141, again using the DES encryption mentioned above. The master key is a random number. A step 142 comprises generating a key authentication code for the combination of the item key and the item authentication key. The key authentication code is generated with a MAC in conjunction with a randomly generated master authentication key 143.

A step 145 is performed of encrypting the master key and the master authentication key with a user key 146. This is again a DES encryption.

The user key is derived from the user-supplied password or code, referenced in FIG. 3 by numeral 147. To generate the user key, the user-supplied password 147 is appended to a random number referred to as a salt 148, and hashed in a step 149 using an SHA-1 hashing function. This results in a number that is used as the user key.

Once these steps are performed, the storage server stores the encrypted individual data item, the item authentication code, the encrypted item key, the encrypted item authentication key, the key authentication code, the encrypted master key, and the encrypted master authentication key, to be retrieved later when requested by an authorized application program.

Retrieval comprises the reverse process. The encrypted items are retrieved from storage. The storage provider derives the user key from the user-supplied password and uses the user key to decrypt the master key and master authentication key. The master authentication key is used in conjunction with the specified MAC to verify that the master key decrypted correctly. The master key then used to decrypt an appropriate item key and corresponding item authentication key. The item authentication key is used in conjunction with the MAC to verify that the item key decrypted correctly. The item key is then used to decrypt the actual data item.

This process allows all of a user's data items to be controlled by a single master key that is in turn encrypted as a function of the user's password. The advantage of this scheme is that data items do not have to be re-encrypted when the user changes his or her password. Rather, only the master key needs to be encrypted again.

Verification of Storage System Integrity

The storage server, the storage providers, and the authentication providers employ a security interlock mechanism to prevent security violations that might result from tampering with system components. This mechanism utilizes cryptographic techniques.

One motivation for the security interlock mechanism is to prevent non-authorized providers from being loaded by the storage server. It is particularly important to prevent a non-authorized module from masquerading as an authorized provider, since such a non-authorized module could steal secret data from the system. Another motivation is to prevent tampering with the storage server itself.

When the server and providers are shipped, they are digitally signed with the private key of a public/private cryptographic key pair—the private key has a corresponding public key. The public key is then hard-coded into the various modules of the server and providers. The server and the providers are configured to verify each others' signatures using the public cryptographic key whenever an individual component is loaded and executed. When the server is loaded, it first checks its own integrity by checking its own digital signature with the public key. The server then checks the digital signatures of other core components as they are loaded. As each component is loaded, it checks the digital signature of the server. If any integrity check fails, none of the components will operate.

Authentication of Requesting Application Programs

As discussed above, access to data items can be restricted based on which application programs are trying to access the data items. For this feature to be reliable, the storage system needs to verify that application programs are who they say they are, and that they have not been tampered with. This process is referred to as program authentication. One option is to authenticate programs based on a binary check. Such an authentication is performed by two storage server modules: the identification module and the enforcement module.

The identification module is responsible for interrogating the client that is calling the storage server. In order to identify a process associated with a request, the following steps occur:

1. The client application program identifies itself to the server, presenting two pieces of information: a process ID, and a thread handle. The process ID is obtained using the GetCurrentProcessId( ) system call; the thread handle is obtained using the GetCurrentThread( ) and DuplicateHandle( ) system calls.
2. The storage server opens a handle to the client, using the process ID in a call to the system call OpenProcess( ). The storage server saves this handle for later use.
3. The client makes access requests for data items.
4. The server uses the process handle obtained above to analyze the memory address space associated with the client process. The server also uses this handle to query the underlying operating system about what executable modules (.exe, .dll, etc. files) are present in the associated process, in addition to determining module load addresses; the exact method used to query the operating system varies depending on the operating system.
5. The server now has a complete list of modules associated with the client, and uses it to analyze the call stack associated with the thread handle obtained above. The StackWalk( ) system call is utilized to determine the chain of callers associated with the client.

The enforcement module uses results provided by the identification module in performing the following checks:

1. Verifying that the image loaded into the client process has not been tampered with on-disk. This is accomplished by storing a cryptographic representation of the file(s) that are to be granted access. This cryptographic representation is stored alongside the data. There can be two cryptographic representations of the file:

The entire file is read and then subjected to the SHA-1 cryptographic hash. The output of the hash is stored alongside the data. When subsequent access to the data is requested, the hash is recomputed against the on-disk file, and then compared to that stored alongside the data. If these compare correctly, the process continues to check 2, below.

The file is subject to public key certificate-based validation. This uses Microsoft Authenticode calls to verify that the image has not been tampered with. Authenticode handles hashing the disk image internally. This cryptographic representation of the file is more flexible, because it also supports validation against various fields in the certificate attached to the specified file. After the Authenticode verification takes place, the system analyzes the certificate contents, to make sure they match those that were stored alongside the data being accessed.

2. Verifying that the image on disk matches that loaded into the client process.

The module to be checked is "mapped" into the server address space, using the CreateFileMapping( ) and MapViewOfFile( ) system API calls.

Relocation fixups are applied to the mapped image if necessary—only if the image did not load at the preferred address in the client address space.

The system loops over the image header, looking for read-only sections such as code sections, resources, and read-only data. For each section, it updates an SHA-1-based cryptographic hash.

The process handle output from the identification module is now used to read the memory address space where the module is loaded. This is accomplished by using the ReadProcessMemory( ) system call. Each section of memory is read in the manner outlined in the previous step, updating a cryptographic hash as the process proceeds.

The system compares the two hashes resulting from the preceding steps. If they match, the image in memory has not been tampered with.

Application Interface Functions

As described above, interfaces are exposed to application programs so that application programs can take advantage of protected storage features without having to implement sophisticated encryption schemes and without having to make RPC calls. These interfaces and their functions are described in an attached appendix that forms part of this document. The appendix also provides explanations regarding the proper usage of the interfaces.

CONCLUSION

The invention provides a versatile and efficient architecture that provides a number of advantages over the prior art. One significant advantage is that different application programs can utilize a single, provided server to store core data secrets in a central storage area. This promotes consistency among the applications and removes significant overhead from the applications. The user interface is one area that benefits from the consistency provided by the storage system described above, since user prompts are generated by the system rather than by the individual application programs. Storing data items in a uniform manner also allows them to be managed by a single management program that is independent of the application programs themselves.

Another significant advantage of the invention is that the underlying details of securing data items are hidden from calling application programs. Thus, program developers do not have to implement sophisticated security measures; such measures can be implemented with simple calls to the storage system described herein. An added benefit is that new technologies such as smart cards will be available to application programs without extensive reprogramming.

The invention protects secrets from user-oriented and software-oriented attacks, including attacks from viruses. Significantly, access control is managed outside the application programs that generate and access data items. Because applications do not have direct access to keying material or other control data, access to one piece of data does not imply access to any other data. Furthermore, the storage system itself does not retain the information required to decrypt stored data items. Rather, the user must be present and must supply a correct password to allow data decryption.

A further important benefit of the invention is that users are not forced to explicitly enter passwords when data access is required. Rather, user authentication is performed once, when the user logs on to the computer or network. This logon information is used for both user authentication and to derive keys for data encryption and decryption.

Although the invention has been described in language specific to structural features and/or methodological steps, it is to be understood that the invention defined in the appended claims is not necessarily limited to the specific features or steps described. Rather, the specific features and steps are disclosed as exemplary forms of implementing the claimed invention.

Protected Storage Functions

These functions return pointers to interface objects that are used for accessing and enumerating PStore providers.

The function definitions can be found in pstore.h.

| Functions | Description |
|---|---|
| PStoreCreateInstance | Returns a pointer to the IPStore interface. |
| PStoreEnumProviders | Returns a pointer to the IEnumPStoreProviders interface |

PStoreCreateInstance

This function returns a Protected Storage interface object.

```
HRESULT PStoreCreateInstance(
    IPStore** ppProvider,              // out
    PST_PROVIDERID* pProviderID,       // in
    void* pReserved,                   // in
    DWORD dwFlags                      // in
);
```

Parameters

*ppProvider*
    An indirect pointer to the Protected Storage interface object returned.

*pProvider*
    Specifies the unique identifier for this provider. NULL specifies the System Provider.

*pReserved*
    Must be set to NULL.

*dwFlags*
    The flag values. This parameter is reserved for future use and should be set to zero in the interim to ensure future compatibility.

| HRESULT Value | Meaning |
|---|---|
| PST_E_INVALID_HANDLE | An invalid handle was supplied to the protected storage server. Typically, indicates corruption or invalid handle state managed internally in the COM interface. |
| PST_E_PROV_DLL_NOT_FOUND | Protected storage could not load or locate the specified provider. |
| PST_E_DISK_IMAGE_MISMATCH | Returned when a provider fails an integrity check, and can not be used. Re-install the provider or contact the provider vendor. |
| PST_E_FAIL | Returned if initialization of the provider failed. Typically, indicates a memory allocation failure. |
| PST_E_OK | The method completed successfully. |
| PST_E_SERVICE_UNAVAILABLE | The protected storage service is not running, has not been properly installed, or has been | tampered with. Check that protected storage has been installed correctly.

See Also
IPStore::GetInfo

PStoreEnumProviders

This function returns an enumeration interface object that can be used to enumerate information about all of the installed providers. The information about an individual installed provider is contained in a PST_PROVIDERINFO structure.

HRESULT PStoreEnumProviders(
   DWORD *dwFlags*,    // in
   IEnumPStoreProviders** *ppenum*    // out
);

Parameters
*dwFlags*
   The flag values. This parameter is reserved for future use and should be set to zero in the interim to ensure future compatibility.
*ppenum*
   An indirect pointer to the returned enumeration object.

HRESULT

| Value | Meaning |
|---|---|
| PST_E_INVALID_HANDLE | An invalid handle was supplied to the protected storage server. Typically, indicates corruption or invalid handle state managed internally in the COM interface. |
| PST_E_PROV_DLL_NOT_FOUND | Protected storage could not load or locate the specified provider. |
| PST_E_DISK_IMAGE_MISMATCH | Returned when a provider fails an integrity check, and can not be used. Re-install the provider or contact the provider vendor. |
| PST_E_FAIL | Returned if initialization of the provider failed. Typically, indicates a memory allocation failure. |
| PST_E_OK | The method completed successfully. |
| PST_E_SERVICE_UNAVAILABLE | The protected storage service is not running, has not been properly installed, or has been tampered with. Check that protected storage has been installed correctly. |

Protected Storage Interfaces

Several interface objects are provided for accessing and enumerating PStore providers. The following table lists the interface objects currently available.

| Interface | Description |
| --- | --- |
| IEnumPStoreItems Interface | Contains methods for enumerating PStore Items. |
| IEnumPStoreProviders Interface | Contains methods for enumerating PStore Providers. |
| IEnumPStoreTypes Interface | Contains methods for enumerating PStore Types and Subtypes. |
| IPStore Interface | Contains methods for managing protected data in the specified PStore provider. |

IEnumPStoreItems Interface

This object provides an enumeration interface for items in the Protected Storage area. Items are identified by their LPWSTR name.

The method definitions can be found in pstore.h.

Note that any exceptions thrown internal to these methods are caught and passed back as error codes.

| Methods | Description |
| --- | --- |
| Clone | Creates another enumerator that contains the same enumeration state as the current one. |
| Next | Retrieves the next specified number of items in the enumeration sequence. |
| Reset | Resets the enumeration sequence to the beginning. |
| Skip | Skips over a specified number of elements in the enumeration sequence. |

IEnumPStoreItems::Clone

Creates another enumerator that contains the same enumeration state as the current one.

HRESULT Clone(
 IEnumPStoreItems** *ppenum*   // out
);

Parameters
*ppenum*
 Indirect pointer to the enumeration interface on the enumeration object. If the method is unsuccessful, this parameter's value is undefined.

Return Values

Returns an HRESULT. The following HRESULTS are returned for this method.

| Value | Meaning |
|---|---|
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |
| S_OK | The method completed successfully. |

Remarks

Use this method to record a particular point in the enumeration sequence, and then return to that point at a later time. The new enumerator supports the same interface as the original one.

IEnumPStoreItems::Next

Retrieves the next specified number of items in the enumeration sequence.

```
HRESULT Next(
    DWORD celt,              // in
    LPWSTR* rgelt,           // out
    DWORD* pceltFetched      // in/out
);
```

Parameters

*celt*
　Number of elements being requested.

*rgelt*
　Array of size *celt* (or larger) of the elements of interest. The type of this parameter depends on the item being enumerated.
　See "Remarks" for details on de-allocating each of the returned elements.

*pceltFetched*
　Pointer to the number of elements actually supplied in *rgelt*. Caller can pass in NULL if *celt* is one.

Return Values

Returns an HRESULT. The following HRESULTS are returned for this method.

| Value | Meaning |
|---|---|
| ERROR_INVALID_PARAMETER | Value of *celt* is invalid. |
| ERROR_NO_MORE_ITEMS | Returned fewer elements than requested by *celt*. In this case, unused slots in the enumeration are not set to NULL and *pceltFetched* holds the number of valid entries, even if zero is returned. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |
| S_OK | Returned requested number of | elements—*pceltFetched* set if non-NULL. All requested entries are valid.

Remarks

If there are fewer than the requested number of elements left in the sequence, it retrieves the remaining elements. The number of elements actually retrieved is returned through *pceltFetched* (unless the caller passed in NULL for that parameter).

Each of the returned elements in *rgelt* that contain valid data must be freed through a call to CoTaskMemFree, or a memory leak will occur. For more information, search the Microsoft Platform SDK for the function CoTaskMemFree.

IEnumPStoreItems::Reset

Resets the enumeration sequence to the beginning.

HRESULT Reset(
  void);

Parameters
None.

Return Values
Returns an HRESULT. The following HRESULTS are returned for this method.

| Value | Meaning |
| --- | --- |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |
| S_OK | The enumeration sequence was reset to the beginning. |

Remarks
Using a call to this method to reset the sequence does not guarantee that the same set of objects will be enumerated after the reset, because it depends on the collection being enumerated.

IEnumPStoreItems::Skip

Skips over the next specified number of elements in the enumeration sequence.

HRESULT Skip(
  DWORD *celt*          // in
);

Parameters
*celt*
  Number of elements to be skipped.

Return Values
Returns an HRESULT. The following HRESULTS are returned for this method.

| Value | Meaning |
| --- | --- |

| | |
|---|---|
| ERROR_NO_MORE_ITEMS | Returned fewer elements than requested by *celt*. In this case, unused slots in the enumeration are not set to NULL and *pceltFetched* holds the number of valid entries, even if zero is returned. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |
| S_OK | The number of elements skipped is equal to *celt*. |

IEnumPStoreProviders Interface

This object provides an enumeration interface for the PST_PROVIDERINFO objects in the Protected Storage area.

Note that any exceptions thrown internal to these methods are caught and passed back as error codes.

The method definitions can be found in pstore.h.

| Methods | Description |
|---|---|
| Clone | Creates another enumerator that contains the same enumeration state as the current one. |
| Next | Retrieves the next specified number of items in the enumeration sequence. |
| Reset | Resets the enumeration sequence to the beginning. |
| Skip | Skips over a specified number of elements in the enumeration sequence. |

IEnumPStoreProviders::Clone

Creates another enumerator that contains the same enumeration state as the current one.

```
HRESULT Clone(
  IEnumPStoreProviders** ppenum     // out
);
```

Parameters

*ppenum*
  Indirect pointer to the enumeration interface on the enumeration object. If the method is unsuccessful, this parameter's value is undefined.

Return Values

Returns an HRESULT. The following HRESULTS are returned for this method.

| Value | Meaning |
|---|---|
| PST_E_INVALID_HANDLE | An invalid handle was supplied to the protected storage server. Typically, indicates corruption or invalid handle state managed internally in the COM interface. |

| | |
|---|---|
| PST_E_FAIL | A general failure occurred within protected storage. Typically, indicates a memory allocation failure. |
| S_OK | The method completed successfully. |

Remarks

Use this method to record a particular point in the enumeration sequence, and then return to that point at a later time. The new enumerator supports the same interface as the original one.

IEnumPStoreProviders::Next

Retrieves the next *celt* items in the enumeration sequence.

```
HRESULT Next(
  DWORD celt,                    // in
  PST_PROVIDERINFO** rgelt,      // out
  DWORD *pceltFetched            // in/out
);
```

Parameters

*celt*
  Number of elements being requested.

*rgelt*
  Array of size *celt* (or larger) of the elements of interest. The type of this parameter depends on the item being enumerated.
  See "Remarks" for details on de-allocating each of the returned elements.

*pceltFetched*
  Pointer to the number of elements actually supplied in *rgelt*. Caller can pass in NULL if *celt* is one.

Return Values

Returns an HRESULT. The following HRESULTS are returned for this method.

| Value | Meaning |
|---|---|
| ERROR_INVALID_PARAMETER | Value of *celt* is invalid. |
| ERROR_NO_MORE_ITEMS | Returned fewer elements than requested by *celt*. In this case, unused slots in the enumeration are not set to NULL, and *pceltFetched holds the number of valid entries, even if zero is returned. |
| PST_E_DISK_IMAGE_MISMATCH | Returned when a provider fails an integrity check. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |
| S_OK | Returned requested number of elements—*pceltFetched set if non-NULL. All requested entries are valid. |

Remarks

If there are fewer than the requested number of elements left in the sequence, it retrieves the remaining elements. The number of elements actually retrieved is returned through *pceltFetched* (unless the caller passed in NULL for that parameter).

Each of the returned elements in *rgelt* that contain valid data must be freed through a call to CoTaskMemFree, or a memory leak will occur. For more information, search the Microsoft Platform SDK for the function CoTaskMemFree.

IEnumPStoreProviders::Reset

Resets the enumeration sequence to the beginning.

HRESULT Reset(
  void);

Parameters
None.

Return Values
Returns an HRESULT. The following HRESULTS are returned for this method.

| Value | Meaning |
|---|---|
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |
| S_OK | The enumeration sequence was reset to the beginning. |

Remarks
Using a call to this method to reset the sequence does not guarantee that the same set of objects will be enumerated after the reset, because it depends on the collection being enumerated.

IEnumPStoreProviders::Skip

Skips over the next specified number of elements in the enumeration sequence.

HRESULT Skip(
  DWORD *celt*    // in
);

Parameters
*celt*
  Number of elements to be skipped.

Return Values
Returns an HRESULT. The following HRESULTS are returned for this method.

| Value | Meaning |
|---|---|
| ERROR_NO_MORE_ITEMS | Returned fewer elements than requested by *celt*. In this case, unused slots in the enumeration are not set to NULL and *pceltFetched* holds the |

| | |
|---|---|
| | number of valid entries, even if zero is returned. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |
| S_OK | The number of elements skipped is equal to *celt*. |

IEnumPStoreTypes Interface

This object provides an enumeration interface for Types in the Protected Storage area. Types are identified by their GUID.

Note that any exceptions thrown internal to these methods are caught and passed back as error codes.

The method definitions can be found in pstore.h.

| Methods | Description |
|---|---|
| Clone | Creates another enumerator that contains the same enumeration state as the current one. |
| Next | Retrieves the next specified number of items in the enumeration sequence. |
| Reset | Resets the enumeration sequence to the beginning. |
| Skip | Skips over a specified number of elements in the enumeration sequence. |

IEnumPStoreTypes::Clone

Creates another enumerator that contains the same enumeration state as the current one.

```
HRESULT Clone(
  IEnumPStoreTypes** ppenum        // out
);
```

Parameters
*ppenum*
    Indirect pointer to the enumeration interface on the enumeration object. If the method is unsuccessful, this parameter's value is undefined.

Return Values
Returns an HRESULT. The following HRESULTS are returned for this method.

| Value | Meaning |
|---|---|
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

S_OK                                                The method completed Successfully.

Remarks
Using this method, a client can record a particular point in the enumeration sequence, and then return to that point at a later time. The new enumerator supports the same interface as the original one.

IEnumPStoreTypes::Next

Retrieves the next *celt* items in the enumeration sequence.

```
HRESULT Next(
    DWORD celt,              // in
    GUID* rgelt,             // out
    DWORD* pceltFetched      // in/out
);
```

Parameters

*celt*
   Number of elements being requested.

*rgelt*
   Array of size *celt* (or larger) of the elements of interest. The type of this parameter depends on the item being enumerated.

*pceltFetched*
   Pointer to the number of elements actually supplied in *rgelt*. Caller can pass in NULL if *celt* is one.
   See "Remarks" for details on de-allocating each of the returned elements.

Return Values
Returns an HRESULT. The following HRESULTS are returned for this method.

| Value | Meaning |
|---|---|
| ERROR_INVALID_PARAMETER | Value of *celt* is invalid. |
| ERROR_NO_MORE_ITEMS | Returned fewer elements than requested by *celt*. In this case, unused slots in the enumeration are not set to NULL and *pceltFetched* holds the number of valid entries, even if zero is returned. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |
| S_OK | Returned requested number of elements—*pceltFetched* set if non-NULL. All requested entries are valid. |

Remarks
If there are fewer than the requested number of elements left in the sequence, it retrieves the remaining elements. The number of elements actually retrieved is returned through *pceltFetched* (unless the caller passed in NULL for that parameter).

Each of the returned elements in *rgelt* that contain valid data must be freed through a call to CoTaskMemFree or a memory leak will occur. For more information, search the Microsoft Platform SDK for the function CoTaskMemFree.

IEnumPStoreTypes::Reset

Resets the enumeration sequence to the beginning.

HRESULT Reset(
  void);

Parameters
None.

Return Values
Returns an HRESULT. The following HRESULTS are returned for this method.

| Value | Meaning |
| --- | --- |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |
| S_OK | The enumeration sequence was reset to the beginning. |

Remarks
Using a call to this method to reset the sequence does not guarantee that the same set of objects will be enumerated after the reset, because it depends on the collection being enumerated.

IEnumPStoreTypes::Skip

Skips over the next specified number of elements in the enumeration sequence.

HRESULT Skip(
  DWORD celt         // in
);

Parameters
*celt*
  Number of elements to be skipped.

Return Values
Returns an HRESULT. The following HRESULTS are returned for this method.

| Value | Meaning |
| --- | --- |
| ERROR_NO_MORE_ITEMS | Returned fewer elements than requested by *celt*. In this case, unused slots in the enumeration are not set to NULL and *pceltFetched* holds the number of valid entries, even if zero is returned. |
| PST_E_INVALID_HANDLE | An invalid handle was supplied to the protected storage server. Typically, indicates corruption or invalid handle state managed internally in the COM interface. |
| PST_E_FAIL | A general failure occurred within protected |

| | storage. Typically, indicates a memory allocation failure. |
|---|---|
| S_OK | The number of elements skipped is equal to *celt*. |

IPStore Interface

The IPStore Interface provides methods for managing protected data in the specified PStore provider. The method definitions can be found in pstore.h.

| Methods | Description |
|---|---|
| CloseItem | Closes the specified Item. Subsequent access to the Item will require the provider's default user confirmation style. |
| CreateSubtype | Creates a new Subtype with the specified name in the designated provider, and stores its PST_ACCESSRULESET. |
| CreateType | Creates the specified Type for the specified user/machine. |
| DeleteItem | Deletes the specified Item. A prompt may be generated. |
| DeleteSubtype | Deletes the specified Subtype. |
| DeleteType | Deletes the specified Type. |
| EnumItems | This method returns an enumeration object which can be used to enumerate information about the specified Items. |
| EnumSubtypes | This method returns an enumeration object which can be used to enumerate information about the specified Subtypes. |
| EnumTypes | This method returns an enumeration object which can be used to enumerate information about the specified Types. |
| GetInfo | Retrieves information about the Protected Store interface object obtained from a call to PStoreCreateInstance. |
| GetProvParam | The GetProvParam method retrieves the parameters that govern the operations of a PStore Provider. |
| GetSubtypeInfo | Retrieves the PST_TYPEINFO structure that corresponds to the Subtype specified. |
| GetTypeInfo | Retrieves the PST_TYPEINFO structure for the Type specified. |
| OpenItem | This method opens the specified Item for the indicated access modes. |
| ReadAccessRuleset | This method reads and returns the PST_ACCESSRULESET structure for the given Subtype. |
| ReadItem | This method reads the specified Item and returns it in a data buffer. |
| SetProvParam | The SetProvParam method sets the parameters that govern the operations of a PStore Provider. |
| WriteAccessRuleset | This method sets the PST_ACCESSRULESET for the given Type and Subtype. |
| WriteItem | This method stores the specified data under the specified Type and Subtype, and with the specified name. |

IPStore::CloseItem

Closes the specified Item. Subsequent access to the Item will require the provider's default user confirmation style.

```
HRESULT CloseItem(
    PST_KEY Key,                    // in
    const GUID* pItemType,          // in
    const GUID* pItemSubtype,       // in
    LPCWSTR szItemName,             // in
    DWORD dwFlags                   // in
);
```

Parameters

*Key*
> Specifies the storage area for the Item, and is based on the computer being used or is based on an individual user (where there may be more than one user for this computer).
>
> Currently defined values for *Key* are shown in the following table.
>
>> Key
>> PST_KEY_CURRENT_USER
>> PST_KEY_LOCAL_MACHINE

*pItemType*
> Specifies a pointer to the Type of the Item being closed.

*pItemSubtype*
> Specifies a pointer to the Subtype for the Item being closed.

*szItemName*
> A string specifying the friendly name of the Item being closed.

*dwFlags*
> The flag values. This parameter is reserved for future use and should be set to zero in the interim to ensure future compatibility.

Return Values
Returns an HRESULT. The following HRESULTS are returned for this method.

| Value | Meaning |
|---|---|
| PST_E_OK | The method completed successfully. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

See Also
IPStore::OpenItem

IPStore::CreateSubtype

Creates a new Subtype with the specified name in the provider, and stores its PST_ACCESSRULESET.

```
HRESULT CreateSubtype(
    PST_KEY Key,                    // in
    const GUID* pType,              // in
    const GUID* pSubtype,           // in
```

```
    PST_TYPEINFO* pInfo,           // in
    PST_ACCESSRULESET* pRules,     // in
    DWORD dwFlags                  // in
);
```

Parameters

*Key*

Specifies the storage area for the Subtype being created, and is based on the computer being used or is based on an individual user (where there may be more than one user for this computer).

Currently defined values for *Key* are shown in the following table.

Key
PST_KEY_CURRENT_USER
PST_KEY_LOCAL_MACHINE

*pType*

Specifies a pointer to the Type for which the Subtype is being created.

pstore.h lists the GUIDs for the currently defined Types.

*pSubtype*

Specifies a pointer to the Subtype that is being created.

pstore.h lists the GUIDs for the currently defined Subtypes.

*pInfo*

A pointer to the PST_TYPEINFO structure.

*pRules*

A pointer to the PST_ACCESSRULESET structure for this new Subtype. If a NULL pointer for *pRules* is passed in, it is interpreted as an empty Access Rule Set and there are no application access restrictions. All applications are allowed access.

*dwFlags*

The flag values. This parameter is reserved for future use and should be set to zero in the interim to ensure future compatibility.

Return Values

Returns an HRESULT. The following HRESULTS are returned for this method.

| Value | Meaning |
| --- | --- |
| PST_E_OK | The method completed successfully. |
| PST_E_TYPE_EXISTS | Indicates the Subtype already exists. |
| PST_E_NO_PERMISSIONS | Indicates that the user does not have the permission for this type of operation. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |
| PST_E_INVALID_RULESET | The ruleset specified was invalid. |

See Also
IPStore::DeleteSubtype

IPStore::CreateType

Creates the specified Type for the specified user/machine.

```
HRESULT CreateType(
    PST_KEY Key,                // in
    const GUID* pType,          // in
    PST_TYPEINFO* pInfo,        // in
    DWORD dwFlags               // in
);
```

Parameters

*Key*

Specifies the storage area for the Type being created, and is based on the computer being used or is based on an individual user (where there may be more than one user for this computer).

Currently defined values for *Key* are shown in the following table.

Key
PST_KEY_CURRENT_USER
PST_KEY_LOCAL_MACHINE

*pType*

Specifies a pointer to the Type which is being created.

pstore.h lists the GUIDs for the currently defined Types.

*pInfo*

Specifies a pointer to the PST_TYPEINFO data structure that contains the information about the Type being created.

*dwFlags*

The flag values. This parameter is reserved for future use and should be set to zero in the interim to ensure future compatibility.

Return Values

Returns an HRESULT. The following HRESULTS are returned for this method.

| Value | Meaning |
| --- | --- |
| PST_E_OK | The method completed successfully. |
| PST_E_TYPE_EXISTS | Indicates the Type already exists. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

See Also
IPStore::DeleteType

IPStore::DeleteItem

Deletes the specified Item. A prompt may be generated.

```
HRESULT DeleteItem(
    PST_KEY Key,                   // in
    const GUID* pItemType,         // in
    const GUID* pItemSubtype,      // in
```

```
    LPCWSTR szItemName,              // in
    PST_PROMPTINFO* pPromptInfo,     // in
    DWORD dwFlags                    // in
);
```

Parameters

*Key*
    Specifies the storage area for the Item being deleted, and is based on the computer being used or is based on an individual user (where there may be more than one user for this computer).
    Currently defined values for *Key* are shown in the following table.

Key
    PST_KEY_CURRENT_USER
    PST_KEY_LOCAL_MACHINE

*pItemType*
    Specifies a pointer to the Type of the Item that is being deleted.

*pItemSubtype*
    Specifies a pointer to the Subtype of the Item that is being deleted.

*szItemName*
    A string specifying the friendly name of the Item that is being deleted.

*pPromptInfo*
    Specifies a pointer to the PST_PROMPTINFO data structure that contains the prompting information for a dialog box that is displayed to the user to confirm the deletion of the item.

*dwFlags*
    The flag values. This parameter is reserved for future use and should be set to zero in the interim to ensure future compatibility.

Return Values

Returns an HRESULT. The following HRESULTS are returned for this method.

| Value | Meaning |
|---|---|
| PST_E_OK | The method completed successfully. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

See Also
IPStore::WriteItem

IPStore::DeleteSubtype

Deletes the specified Subtype.

```
HRESULT DeleteSubtype(
    PST_KEY Key,                // in
    const GUID* pType,          // in
    const GUID* pSubtype,       // in
    DWORD dwFlags               // in
);
```

Parameters

*Key*

Specifies the storage area for the Subtype being deleted, and is based on the computer being used or is based on an individual user (where there may be more than one user for this computer).

Currently defined values for *Key* are shown in the following table.

Key
PST_KEY_CURRENT_USER
PST_KEY_LOCAL_MACHINE

*pType*

Specifies a pointer to the Type associated with the Subtype that is being deleted.

pstore.h lists the GUIDs for the currently defined Types.

*pSubtype*

Specifies a pointer to the Subtype that is being deleted. Specifies a pointer to the Subtype that is being created.

pstore.h lists the GUIDs for the currently defined Subtypes.

*dwFlags*

The flag values. This parameter is reserved for future use and should be set to zero in the interim to ensure future compatibility.

Return Values

Returns an HRESULT. The following HRESULTS are returned for this method.

| Value | Meaning |
| --- | --- |
| PST_E_OK | The method completed successfully. |
| PST_E_NOTEMPTY | Indicates that the Subtype still has an Item. The Subtype must be completely empty before it can be deleted. |
| PST_E_NOTEXISTS | Indicates that the Subtype does not exist. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

See Also
IPStore::CreateSubtype

IPStore::DeleteType

Deletes the specified Type.

```
HRESULT DeleteType(
  PST_KEY Key,              // in
  const GUID* pType,        // in
  DWORD dwFlags             // in
);
```

Parameters

*Key*
Specifies the storage area for the Type being deleted, and is based on the computer being used or is based on an individual user (where there may be more than one user for this computer).
Currently defined values for *Key* are shown in the following table.

Key
PST_KEY_CURRENT_USER
PST_KEY_LOCAL_MACHINE

*pType*
Specifies a pointer to the Type that is being deleted.
pstore.h lists the GUIDs for the currently defined Types.

*dwFlags*
The flag values. This parameter is reserved for future use and should be set to zero in the interim to ensure future compatibility.

Return Values
Returns an HRESULT. The following HRESULTS are returned for this method.

| Value | Meaning |
| --- | --- |
| PST_E_OK | The method completed successfully. |
| PST_E_NOTEMPTY | Indicates that the Type still has an Item or Subtype. The Type must be completely empty before it can be deleted. |
| PST_E_NOTEXISTS | Indicates that the Type does not exist. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

See Also
IPStore::CreateType

IPStore::EnumItems

This method returns an enumeration object that can be used to enumerate information about the specified Items.

```
HRESULT EnumItems(
    PST_KEY Key,                    // in
    const GUID* pItemType,          // in
    const GUID* pItemSubtype,       // in
    DWORD dwFlags,                  // in
    IEnumPStoreItems** ppenum       // in/out
);
```

Parameters
*Key*
Specifies the storage area for the Item being enumerated, and is based on the computer being used or is based on an individual user (where there may be more than one user for this computer).
Currently defined values for *Key* are shown in the following table.

Key
PST_KEY_CURRENT_USER
PST_KEY_LOCAL_MACHINE

*pItemType*
  Specifies a pointer to the Type of the Item that is being enumerated.
  pstore.h lists the GUIDs for the currently defined Types.

*pItemSubtype*
  Specifies a pointer to the Subtype of the Item that is being enumerated.
  pstore.h lists the GUIDs for the currently defined Subtypes.

*dwFlags*
  The flag values. This parameter is reserved for future use and should be set to zero in the interim to ensure future compatibility.

*ppenum*
  An indirect pointer to the returned enumeration object. See "Remarks" for details on de-allocating the enumeration object.

Return Values
Returns an HRESULT. The following HRESULTS are returned for this method.

| Value | Meaning |
|---|---|
| PST_E_OK | The method completed successfully. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

Remarks
The enumeration object returned in *ppenum* must be freed through a call to CoTaskMemFree or a memory leak will occur. For more information, search the Microsoft Platform SDK for the function CoTaskMemFree.

See Also
IPStore::EnumSubtypes, IPStore::EnumTypes

IPStore::EnumSubtypes

This method returns an enumeration object that can be used to enumerate information about the specified Subtypes.

Note that there are no access restrictions on enumerating Subtypes. Note that the same enumerator as in EnumTypes is used.

```
HRESULT EnumSubtypes(
    PST_KEY Key,                    // in
    const GUID* pType,              // in
    DWORD dwFlags,                  // in
    IEnumPStoreTypes** ppenum       // in
);
```

Parameters

*Key*
Specifies the storage area for the Subtype being enumerated, and is based on the computer being used or is based on an individual user (where there may be more than one user for this computer).
Currently defined values for *Key* are shown in the following table.

Key
PST_KEY_CURRENT_USER
PST_KEY_LOCAL_MACHINE

*pType*
Specifies a pointer to the Type that is being enumerated.
pstore.h lists the GUIDs for the currently defined Types.

*dwFlags*
The flag values. This parameter is reserved for future use and should be set to zero in the interim to ensure future compatibility.

*ppenum*
An indirect pointer to the returned enumeration object. See "Remarks" for details on de-allocating the enumeration object.

Return Values
Returns an HRESULT. The following HRESULTS are returned for this method.

| Value | Meaning |
| --- | --- |
| PST_E_OK | The method completed successfully. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

Remarks
The enumeration object returned in *ppenum* must be freed through a call to CoTaskMemFree or a memory leak will occur. For more information, search the Microsoft Platform SDK for the function CoTaskMemFree.

See Also
IPStore::EnumItems, IPStore::EnumTypes

IPStore::EnumTypes

This method returns an enumeration object that can be used to enumerate information about the specified Types.

Note that there are no access restrictions on enumerating Types.

```
HRESULT EnumTypes(
    PST_KEY Key,                    // in
    DWORD dwFlags,                  // in
    IEnumPStoreTypes** ppenum       // in
);
```

Parameters
*Key*

Specifies the storage area for the Type being enumerated, and is based on the computer being used or is based on an individual user (where there may be more than one user for this computer). Currently defined values for *Key* are shown in the following table.

Key
PST_KEY_CURRENT_USER
PST_KEY_LOCAL_MACHINE

*dwFlags*
The flag values. This parameter is reserved for future use and should be set to zero in the interim to ensure future compatibility.

*ppenum*
An indirect pointer to the returned enumeration object. See "Remarks" for details on de-allocating the enumeration object.

Return Values
Returns an HRESULT. The following HRESULTS are returned for this method.

| Value | Meaning |
| --- | --- |
| PST_E_OK | The method completed successfully. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

Remarks
The enumeration object returned in *ppenum* must be freed through a call to CoTaskMemFree or a memory leak will occur. For more information, search the Microsoft Platform SDK for the function CoTaskMemFree.

See Also
IPStore::EnumItems, IPStore::EnumSubtypes

IPStore::GetInfo

Retrieves information about the Protected Store interface object obtained from a call to PStoreCreateInstance. Information about the provider's identifier, capabilities supported, and its friendly name are returned. (A PST_PROVIDERINFO is also returned by PStoreEnumProviders.)

```
HRESULT GetInfo(
  PPST_PROVIDERINFO* ppProperties           // out
);
```

Parameters
*ppProperties*
A pointer to the PST_PROVIDERINFO structure returned. See "Remarks" for details on it's de-allocation.

Return Values
Returns an HRESULT. The following HRESULTS are returned for this method.

| Value | Meaning |
| --- | --- |

| | |
|---|---|
| PST_E_OK | The method completed successfully. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

Remarks
The PST_PROVIDERINFO returned in *ppProviderProperties* must be freed through a call to CoTaskMemFree or a memory leak will occur. For more information, search the Microsoft Platform SDK for the function CoTaskMemFree.

See Also
IPStore::GetSubtypeInfo, IPStore::GetTypeInfo

IPStore::GetProvParam

The GetProvParam method retrieves the parameters that govern the operations of a PStore Provider. This method is Provider dependent.

```
HRESULT GetProvParam(
    DWORD dwParam,          // in
    DWORD* pcbData,         // in /out
    BYTE** ppbData,         // out
    DWORD dwFlags           // in
);
```

Parameters

*dwParam*
    The parameter number. Currently, no parameters are defined for which this get operation is applicable. However, there is a parameter defined for the set operation. See SetProvParam for details.

*pcbData*
    A pointer to the length of the parameter data buffer. Upon return, this address will contain the number of bytes of parameter data copied to the buffer.

*ppbData*
    An indirect pointer to the parameter data buffer allocated by this method. The method copies the specified parameter data to the allocated buffer. The form of this data will vary, depending on the parameter number. See "Remarks" for details on it's de-allocation.

*dwFlags*
    This parameter is reserved for future use and should be set to zero in the interim to ensure future compatibility.

Return Values
Returns an HRESULT. The following HRESULTS are returned for this method.

| Value | Meaning |
|---|---|
| PST_E_OK | The method completed successfully. |
| PST_E_INVALID_HANDLE | An invalid handle was supplied to the protected storage server. Typically, indicates corruption or invalid handle state managed internally in the COM interface. |

| | |
|---|---|
| PST_E_FAIL | A general failure occurred within protected storage. Typically, indicates a memory allocation failure. |

Remarks

The memory buffer returned in *ppbData* must be freed through a call to CoTaskMemFree or a memory leak will occur. For more information, search the Microsoft Platform SDK for the function CoTaskMemFree.

See Also
IPStore::SetProvParam

IPStore::GetSubtypeInfo

Retrieves the PST_TYPEINFO structure that corresponds to the Subtype specified.

Note that there are no access restrictions on obtaining Subtype info.

```
HRESULT GetSubtypeInfo(
    PST_KEY Key,              // in
    const GUID* pType,        // in
    const GUID* pSubtype,     // in
    PPST_TYPEINFO* ppInfo,    // out
    DWORD dwFlags             // in
);
```

Parameters

*Key*
  Specifies the storage area for the Subtype for which the PST_TYPEINFO information is being retrieved, and is based on the computer being used or is based on an individual user (where there may be more than one user for this computer).

Currently defined values for *Key* are shown in the following table.

*Key*
  PST_KEY_CURRENT_USER
  PST_KEY_LOCAL_MACHINE

*pType*
  Specifies a pointer to the Type for the specified Subtype for which data is being retrieved.

*pSubtype*
  A pointer to the specified Subtype for which data is being retrieved.

*ppInfo*
  A pointer to the PST_TYPEINFO structure retrieved. See "Remarks" for details on it's de-allocation.

*dwFlags*
  The flag values. This parameter is reserved for future use and should be set to zero in the interim to ensure future compatibility.

Return Values

Returns an HRESULT. The following HRESULTS are returned for this method.

| Value | Meaning |
|---|---|
| PST_E_OK | The method completed successfully. |
| PST_E_INVALID_HANDLE | An invalid handle was supplied to the protected storage server. Typically, indicates corruption or invalid handle |

| | state managed internally in the COM interface. |
|---|---|
| PST_E_FAIL | A general failure occurred within protected storage. Typically, indicates a memory allocation failure. |

Remarks

The PST_TYPEINFO returned in *ppInfo* must be freed through a call to CoTaskMemFree or a memory leak will occur. For more information, search the Microsoft Platform SDK for the function CoTaskMemFree.

See Also
IPStore::GetInfo, IPStore::GetTypeInfo

IPStore::GetTypeInfo

Retrieves the PST_TYPEINFO structure for the Type specified.

Note that there are no access restrictions on obtaining Subtype information.

```
HRESULT GetTypeInfo(
    PST_KEY Key,              // in
    const GUID* pType,        // in
    PPST_TYPEINFO* ppInfo,    // out
    DWORD dwFlags             // in
);
```

Parameters

*Key*
    Specifies the storage area for the Type for which the PST_TYPEINFO information is being retrieved, and is based on the computer being used or is based on an individual user (where there may be more than one user for this computer).

Currently defined values for *Key* are shown in the following table.

*Key*
    PST_KEY_CURRENT_USER
    PST_KEY_LOCAL_MACHINE

*pType*
    A pointer to the specified Type for which data is being retrieved.

*ppInfo*
    A pointer to the PST_TYPEINFO structure retrieved. See "Remarks" for details on it's de-allocation.

*dwFlags*
    The flag values. This parameter is reserved for future use and should be set to zero in the interim to ensure future compatibility.

Return Values
Returns an HRESULT. The following HRESULTS are returned for this method.

| Value | Meaning |
|---|---|
| PST_E_OK | The method completed successfully. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. |

Typically, indicates a memory allocation failure.

Remarks

The PST_TYPEINFO returned in *ppInfo* must be freed through a call to CoTaskMemFree or a memory leak will occur. For more information, search the Microsoft Platform SDK for the function CoTaskMemFree.

See Also

IPStore::GetInfo, IPStore::GetSubtypeInfo

IPStore::OpenItem

This method opens the specified Item for the indicated access modes. The Item will remain open until CloseItem is called or the interface pointer is destroyed. If an Item is open, calls to ReadItem, WriteItem, DeleteItem, EnumItem will not require any user confirmation.

```
HRESULT OpenItem(
    PST_KEY Key,                      // in
    const GUID* pItemType,            // in
    const GUID* pItemSubtype,         // in
    LPCWSTR szItemName,               // in
    PST_ACCESSMODE ModeFlags,         // in
    PST_PROMPTINFO* pPromptInfo,      // in
    DWORD dwFlags                     // in
);
```

Parameters

*Key*

Specifies the storage area for the Item, and is based on the computer being used or is based on an individual user (where there may be more than one user for this computer).

Currently defined values for *Key* are shown in the following table.

*Key*

PST_KEY_CURRENT_USER

PST_KEY_LOCAL_MACHINE

*pItemType*

Specifies a pointer to the Type of the Item being opened.

*pItemSubtype*

Specifies a pointer to the Subtype for the Item being opened.

*szItemName*

A string specifying the friendly name of the Item being opened.

*ModeFlags*

Specifies the modes for which the Item is being opened.

*pPromptInfo*

Specifies a pointer to the PST_PROMPTINFO data structure that contains the prompting information for a dialog box that is displayed to the user to confirm the opening of the item.

*dwFlags*

The flag values. This parameter is reserved for future use and should be set to zero in the interim to ensure future compatibility.

Return Values

Returns an HRESULT. The following HRESULTS are returned for this method.

| Value | Meaning |
| --- | --- |
| PST_E_OK | The method completed successfully. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

See Also
IPStore::CloseItem

IPStore::ReadAccessRuleset

This method reads and returns the PST_ACCESSRULESET structure for the given Subtype.

Note that in order to read the Access Rules, the caller must satisfy the existing Access Rules.

```
HRESULT ReadAccessRuleset(
    PST_KEY Key,                    // in
    const GUID* pType,              // in
    const GUID* pSubtype,           // in
    PPST_ACCESSRULESET* ppRules,    // out
    DWORD dwFlags                   // in
);
```

Parameters

*Key*
    Specifies the storage area for the Access Rules, and is based on the computer being used or is based on an individual user (where there may be more than one user for this computer).

Currently defined values for *Key* are shown in the following table.

Key
    PST_KEY_CURRENT_USER
    PST_KEY_LOCAL_MACHINE

*pType*
    Specifies a pointer to the specified Type for which the Access Rules are being read.

*pSubtype*
    Specifies a pointer to the specified Subtype for which the Access Rules are being read.

*ppRules*
    A pointer to the PST_ACCESSRULESET structure returned. See "Remarks" for details on it's de-allocation.

*dwFlags*
    The flag values. This parameter is reserved for future use and should be set to zero in the interim to ensure future compatibility.

Return Values

Returns an HRESULT. The following HRESULTS are returned for this method.

| Value | Meaning |
| --- | --- |
| PST_E_OK | The method completed successfully. |

| | |
|---|---|
| PST_E_NOTEXISTS | Indicates that the Type does not exist. |
| PST_E_NO_PERMISSIONS | Indicates that the user does not have the permission for this type of operation. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

Remarks
The PST_ACCESSRULESET returned in *ppRules* must be freed through a call to CoTaskMemFree or a memory leak will occur. For more information, search the Microsoft Platform SDK for the function CoTaskMemFree.

See Also
IPStore::WriteAccessRuleset

IPStore::ReadItem

This method reads the specified Item and returns it in a data buffer.

Calling ReadItem may initiate user confirmation, depending on how the user has defined the Item.

```
HRESULT ReadItem(
    PST_KEY Key,                      // in
    const GUID* pItemType,            // in
    const GUID* pItemSubtype,         // in
    LPCWSTR szItemName,               // in
    DWORD* pcbData,                   // in/out
    BYTE** ppbData,                   // out
    PST_PROMPTINFO* pPromptInfo,      // in
    DWORD dwFlags                     // in
);
```

Parameters
*Key*
   Specifies the storage area for the Item, and is based on the computer being used or is based on an individual user (where there may be more than one user for this computer).
   Currently defined values for *Key* are shown in the following table.

*Key*
   PST_KEY_CURRENT_USER
   PST_KEY_LOCAL_MACHINE

*pItemType*
   Specifies a pointer to the Type of the Item being read.
*pItemSubtype*
   Specifies a pointer to the Subtype for the Item being read.
*szItemName*
   A string specifying the friendly name of the Item being read.
*pcbData*
   A pointer to the length of the data buffer. Upon return, this address will contain the number of bytes of data copied to the buffer.

*ppbData*
    An indirect pointer to the data buffer allocated by this method in which the Item is returned. This method will copy the specified Item to this buffer. See "Remarks" for details on de-allocating the buffer.

*pPromptInfo*
    Specifies a pointer to the PST_PROMPTINFO data structure that contains the prompting information for a dialog box that is displayed to the user to confirm the reading of the item.

The prompt string and any other application supplied information appears in the *application prompt area* in the user confirmation dialog box when user confirmation is required. The rest of the confirmation dialog is not controlled by the application.

*dwFlags*
    The flag values.

Currently defined values for *dwFlags* are shown in the following table.

dwFlags
        PST_UNRESTRICTED_ITEMDATA

PST_UNRESTRICTED_ITEMDATA specified requests that the Provider read unprotected data associated with the Item, to which access is unrestricted. If the Item does not exist, an error will be returned.

Return Values
Returns an HRESULT. The following HRESULTS are returned for this method.

| Value | Meaning |
| --- | --- |
| PST_E_OK | The method completed successfully. |
| PST_E_NO_PERMISSIONS | Indicates that the user does not have the permission for this type of operation. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

Remarks
The memory buffer returned in *ppbData* must be freed through a call to CoTaskMemFree or a memory leak will occur. For more information, search the Microsoft Platform SDK for the function CoTaskMemFree.

See Also
IPStore::WriteItem

IPStore::SetProvParam

The SetProvParam method sets the parameters that govern the operations of a PStore Provider. This method is Provider dependent.

```
HRESULT SetProvParam(
   DWORD dwParam,        // in
   DWORD cbData,         // in
   BYTE* pbData,         // in
   DWORD dwFlags         // in
```

);

Parameters

*dwParam*
　The parameter number. See "Remarks" section for a list of valid parameters.

*cbData*
　The length of the parameter data buffer. Before calling this method, the caller should set this parameter to the length, in bytes, of the *ppbData* buffer.

*pbData*
　A pointer to the parameter data buffer. Place the parameter data in this buffer before calling SetProvParam. The form of this data will vary, depending on the parameter number.

*dwFlags*
　The flag values. This parameter is reserved for future use and should be set to zero in the interim to ensure future compatibility.

Return Values
Returns an HRESULT. The following HRESULTS are returned for this method.

| Value | Meaning |
| --- | --- |
| PST_E_OK | The method completed successfully. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

Remarks
*dwParam* can be set to PST_PP_FLUSH_PW_CACHE to flush the password cache. As a result, any passwords the user has selected to be remembered (by checking the appropriate box in a confirmation dialog) are flushed from memory, and will need to be re-entered the next time they are used in an operation.

See Also
IPStore::GetProvParam

IPStore::WriteAccessRuleset

This method sets the PST_ACCESSRULESET for the given Type and Subtype.

Note that in order to set new Access Rules, the caller must satisfy the existing Access Rules.

```
HRESULT WriteAccessRuleset(
    PST_KEY Key,                    // in
    const GUID* pType,              // in
    const GUID* pSubtype,           // in
    PST_ACCESSRULESET* pRules,      // in
    DWORD dwFlags                   // in
);
```

Parameters

*Key*
　Specifies the storage area for the Access Rules, and is based on the computer being used or is based on an individual user (where there may be more than one user for this computer). Currently defined values for Key are shown in the following table.

Key
PST_KEY_CURRENT_USER
PST_KEY_LOCAL_MACHINE

*pType*
Specifies a pointer to the specified Type for which the Access Rules are being set.
*pSubtype*
Specifies a pointer to the specified Subtype for which the Access Rules are being set.
*pRules*
A pointer to the PST_ACCESSRULESET structure that contains the new value for the Access Rules.

If a NULL pointer for *pRules* is passed in, it is interpreted as an empty Access Rule Set and there are no application access restrictions. All applications are allowed access.
*dwFlags*
The flag values. This parameter is reserved for future use and should be set to zero in the interim to ensure future compatibility.

Return Values
Returns an HRESULT. The following HRESULTS are returned for this method.

| Value | Meaning |
| --- | --- |
| PST_E_OK | The method completed successfully. |
| PST_E_NO_PERMISSIONS | Indicates that the user does not have the permission for this type of operation. |
| PST_E_INVALID_RULESET | The ruleset specified was invalid. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

See Also
IPStore::ReadAccessRuleset

IPStore::WriteItem

This method stores the specified data under the specified Type and Subtype, and with the specified name. If the Item already exists, and the PST_NO_OVERWRITE flag is specified, then the Item is not written and an error is generated.

```
HRESULT WriteItem(
    PST_KEY Key,                          // in
    const GUID* pItemType,                // in
    const GUID* pItemSubtype,             // in
    LPCWSTR szItemName,                   // in
    DWORD cbData,                         // in
    BYTE* pbData,                         // in
    PST_PROMPTINFO* pPromptInfo,          // in
    DWORD dwDefaultConfirmationStyle,     // in
```

```
    DWORD dwFlags                    // in
);
```

Parameters

*Key*
> Specifies the storage area for the Item, and is based on the computer being used or is based on an individual user (where there may be more than one user for this computer).
>
> Currently defined values for *Key* are shown in the following table.
>> Key
>> PST_KEY_CURRENT_USER
>> PST_KEY_LOCAL_MACHINE

*pItemType*
> Specifies a pointer to the Type of the Item being set.

*pItemSubtype*
> Specifies a pointer to the Subtype for the Item being set.

*szItemName*
> A string specifying the friendly name of the Item being set.

*cbData*
> The length of the data buffer. Before calling this method, the caller should set this parameter to the length, in bytes, of the *pbData* buffer.

*pbData*
> A pointer to the data buffer that contains the specified Item to be set.

*pPromptInfo*
> Specifies a pointer to the PST_PROMPTINFO data structure that contains the prompting information for a dialog box that is displayed to the user to confirm the reading of the item.

*dwDefaultConfirmationStyle*
> Specifies the default confirmation behavior to be used for prompting the user.
>
> If the item does not yet exist, the application may specify a default confirmation behavior to be used for this item, via *dwDefaultConfirmationStyle*. Note that, although there are many circumstances under which the user will not be prompted when an Item is first written, this is not guaranteed. Therefore, an appropriate *pPromptInfo* parameter should always be passed in.
>
> Currently defined values for *dwDefaultConfirmationStyle* are shown in the following table.
>> *dwDefaultConfirmationStyle*
>> PST_CF_DEFAULT
>> PST_CF_NONE
>
> PST_CF_DEFAULT specifies that the default confirmation behavior be used, which may be set by the user or administrator. For the system Provider, the default depends on whether the user is logged in (typical in corporate settings) or not (typical in home settings). For the PStore System Provider, if the user is logged in, the Windows password will be used as the default confirmation behavior; otherwise OK / Cancel will be used.
>
> PST_CF_NONE specifies that the application requests silent access, that is, no user confirmation is required for accessing items of this Type. Note that the Provider is not required to honor this request. If honored, the prompt will not be displayed (no UI will be presented in creating this Subtype).

*dwFlags*
> The flag values.
>
> Currently defined values for *dwFlags* are shown in the following table.

*dwFlags*
PST_NO_OVERWRITE
PST_UNRESTRICTED_ITEMDATA

PST_NO_OVERWRITE specifies that if the Item already exists, the Item will not be written and the error PST_E_EXISTS will be returned. One use of this flag is, as in the case of per-Item confirmation, to ensure that another application hasn't already created the Item with inappropriate confirmation. (It is also possible to find out whether the Item exists by enumerating Items in the Subtype). Opening the Item will not nullify the NO_OVERWRITE protection. Unrestricted Item data can still be added, despite the NO_OVERWRITE protection.

PST_UNRESTRICTED_ITEMDATA requests that the Provider write unprotected data associated with the Item, to which access is unrestricted. If the Item does not yet exist (having been written without this flag) an error will be returned.

For items with an unrestricted data stream the following applies:

Deleting the item also deletes it's unrestricted data stream.

Combining PST_UNRESTRICTED_ITEMDATA with PST_NO_OVERWRITE has no effect on the overwrite characteristics of the unrestricted item data stream.

Return Values
Returns an HRESULT. The following HRESULTS are returned for this method.

| Value | Meaning |
|---|---|
| PST_E_OK | The method completed successfully. |
| PST_E_NOTEXISTS | Indicates the Item's Type and Subtype do not currently exist. |
| PST_E_NO_PERMISSIONS | Indicates that the user does not have permission for this type of operation. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

See Also
IPStore::ReadItem

Protected Storage Data Structures

The following data structures are used by the functions and methods contained in the Microsoft® Protected Storage API. The structures are listed alphabetically.

These structures can be found in pstore.h.

This structure contains a single instance of access clause data. It is used at the time of Subtype creation, and establishes rules governing which applications and users should be granted access to protected data.

More than one access clause can be used to establish a single access rule. This is accomplished by adding additional PST_ACCESSCLAUSE structures to the rgClauses array contained in the PST_ACCESSRULE data structure.

```
typedef struct _PST_ACCESSCLAUSE
    {
    DWORD cbSize;
    PST_ACCESSCLAUSETYPE ClauseType;
    DWORD cbClauseData;
    VOID* pbClauseData;
    }   PST_ACCESSCLAUSE;
```

Members
cbSize
    The count of bytes in this data structure. It should be set to sizeof(PST_ACCESSCLAUSE).

ClauseType
    Specifies the type of the clause data contained in the pbClauseData member.
    Currently defined access clause types are shown in the following table, and described in the text that follows it.

ClauseType
PST_AUTHENTICODE
PST_BINARY_CHECK
PST_SECURITY_DESCRIPTOR

PST_AUTHENTICODE
    A ClauseType of PST_AUTHENTICODE specifies that pbClauseData points to a PST_AUTHENTICODEDATA data structure.
    If the PST_AUTHENTICODE clause type was specified at the time of Subtype creation, a check will be made to see if the requesting application was signed or not, and if signed, by whom. The clause may specify a particular root, certificate issuer, publisher (signer), or program name. Access will not be granted unless the specified criteria are met. Not all of the criteria need be specified for access. If none are specified, the verification amounts to allowing any Authenticode verified application or module access to the data. Authenticode checking uses Wintrust.dll to verify the binary of the module under inspection. For more information on Authenticode, search for "Authenticode" on http://www.microsoft.com.
    Note that applications may provide additional checking of their own. For instance, an application such as the Java virtual machine may choose to verify that Java classes are being run.

PST_BINARY_CHECK
    A ClauseType of PST_BINARY_CHECK specifies that pbClauseData points to a PST_BINARYCHECKDATA data structure.
    When an application is installed, or loaded, PStore can be prompted to take a "snapshot" (hash) of the binary pattern for that application. Then, when the application is loaded at a later time, PStore again takes the hash of the application and compares the original hash with the one just taken. Only if the two hashes match will PStore allow the application access to the specified data. Thus, if the application has changed since it was installed, and therefore the possibility exists that it has been tampered with, the data will be protected.

PST_SECURITY_DESCRIPTOR

A ClauseType of PST_SECURITY_DESCRIPTOR specifies that pbClauseData points to the Microsoft Windows NT® security descriptor.

The PST_SECURITY_DESCRIPTOR clause is intended to allow access only to specified users or groups, and is enforced only on Windows NT platforms. If this clause is applied on a Microsoft Windows® 95 platform, it will be ignored. This clause gets the necessary information about the current user and groups from the ACLs contained in the Windows NT security descriptor. Setting the SACL in the security descriptor has no effect in this version of PStore. Audit is supported natively at a higher level in PStore (e.g., all actions such as creating Types and Subtypes, and Item read/write and deletion can all be audited).

cbClauseData

Specifies the count of bytes in the data pointed to by pbClauseData.

pbClauseData

A pointer to the data specified by the ClauseType.

See Also
PST_ACCESSRULE, PST_AUTHENTICODEDATA, PST_BINARYCHECKDATA

PST_ACCESSRULE

This structure contains an array of PST_ACCESSCLAUSE data structures. This grouping together of Access Clause data structures forms an Access Rule. For an Access Rule to be considered granted, all of the individual Access Clauses that it contains must grant access. In other words, an Access Rule is considered granted based on a logical AND of all the Access Clauses that it contains.

More than one access rule can be applied to a given Subtype. To do this, PST_ACCESSRULE data structures are combined in an array as part of the PST_ACCESSRULESET data structure. If more than one rule is added to the array, access to the protected data will be granted if any one of the rules grant access, but only for the mode of access granted in that rule. In other words, the rules are evaluated on a logical OR basis, and the first one in the array is evaluated first.

```
typedef struct   _PST_ACCESSRULE
    {
    DWORD cbSize;
    PST_ACCESSMODE AccessModeFlags;
    DWORD cClauses;
    PST_ACCESSCLAUSE *rgClauses;
    }    PST_ACCESSRULE;
```

Members
cbSize

The count of bytes in this data structure. It should be set to sizeof(PST_ACCESSRULE).

AccessModeFlags

Each access rule has an access mode flag associated with it. This flag determines the type of access granted if all of the clauses are satisfied. There are two Access Modes currently defined, *Read* and *Write* access. Read allows only the retrieving of protected data, whereas Write only allows the storing of protected data. The Read and Write access modes may be combined with a bitwise OR operation (PST_READ | PST_WRITE) to allow both reading and writing accesses. Other modes may be added in the future.

Currently defined values for AccessModeFlags are shown in the following table:

AccessModeFlags

PST_READ
PST_WRITE cClauses
Specifies the count of Access Clause elements in the rgClauses array.

rgClauses
Contains an array of PST_ACCESSCLAUSE elements.

See Also
PST_ACCESSCLAUSE, PST_ACCESSRULESET

PST_ACCESSRULESET

Access to protected data by applications is controlled through the use of Access Rules.

This structure contains an array of PST_ACCESSRULE data structures. This grouping together of access rule data structures forms the Access Rules. The Access Rules are considered to be granted if any of the individual PST_ACCESSRULE data structures that it contains grant access. In other words, the Access Rules are considered granted based on a logical OR of all the PST_ACCESSRULE data structures that it contains.

Access Rules are specified for a particular Type and Subtype combination within a given Repository, and are established at the time of Subtype creation. The Access Rules for any Item within the Repository move with the Repository and are available when required.

```
typedef struct  _PST_ACCESSRULESET
    {
    DWORD cbSize;
    DWORD cRules;
    PST_ACCESSRULE *rgRules;
    }   PST_ACCESSRULESET;
```

Members cbSize
The count of bytes in this data structure. It should be set to sizeof(PST_ACCESSRULESET).

cRules
Specifies the count of Access Rule elements in the rgRules array.

rgRules
Contains an array of PST_ACCESSRULE elements.

See Also
PST_ACCESSRULE, IPStore::CreateSubtype, IPStore::ReadAccessRuleset, IPStore::WriteAccessRuleset

PST_AUTHENTICODEDATA

A structure used to store the data for an Access Clause type of PST_AUTHENTICODE. It may be pointed to by the pbClauseData member of the PST_ACCESSCLAUSE data structure.

```
typedef struct  _PST_AUTHENTICODEDATA
    {
    DWORD cbSize;
    DWORD dwModifiers;
```

```
    LPCWSTR szRootCA;
    LPCWSTR szIssuer;
    LPCWSTR szPublisher;
    LPCWSTR szProgramName;
}   PST_AUTHENTICODEDATA, *PPST_AUTHENTICODEDATA, *LPPST_AUTHENTICODEDATA;
```

Members
cbSize
   The count of bytes in this data structure. It should be set to sizeof(PST_AUTHENTICODEDATA).
dwModifiers
   Determines what calling code can have access to the protected data.

Currently defined values for dwModifiers determine which one of a chain of callers must be verified, and are shown in the following table. Use, at most, one of this group of modifiers — they should not be logically ORed.

dwModifiers

PST_AC_SINGLE_CALLER

PST_AC_TOP_LEVEL_CALLER

PST_AC_IMMEDIATE_CALLER

In order to get the best security, it is recommended that the application use the most specific modifier that applies. If possible, use the default, which is PST_AC_SINGLE_CALLER.
   PST_AC_SINGLE_CALLER
      Use this modifier when there is only a single level in the call chain to PStore, the executable, and there are no intermediate DLLs called. To gain access to the protected data, the caller must pass the verification check. This is the default modifier, so if zero is used for dwModifiers, the same result will be achieved. This modifier achieves the highest level of security.
   PST_AC_TOP_LEVEL_CALLER
      Use this modifier when the protected data is to be accessed by a given executable but calls may go through other DLLs; as might be the case when an application must access the data through various DLLs, depending on settings within the application. In this case, the top level caller (executable) will be verified, but the intermediate DLLs will not.
   PST_AC_IMMEDIATE_CALLER
      Use this modifier when the protected data is to be accessed by a given DLL that may be called by various executables. In this case, the immediate caller (DLL) will be verified, but any other intermediate DLLs and the executable will not.
szRootCA szIssuer
   Specifies the certificate issuer for the publisher (signer) of the application code. It is used to authenticate the signer. When NULL is specified, any issuer is acceptable.

szPublisher
   Specifies the publisher that must have signed the application code in order for an Access Clause to grant access. When NULL is specified, any publisher is acceptable.
szProgramName
   Specifies the application program name that may have access to the protected data. When NULL is specified, any ~~applica~~ Application program name is acceptable.

See Also
PST_ACCESSCLAUSE

PST_BINARYCHECKDATA

A structure used to store the binary check data for an Access Clause check. It may be pointed to by the pbClauseData member of the PST_ACCESSCLAUSE data structure.

```
typedef struct PST_BINARYCHECKDATA {
    DWORD cbSize;
    DWORD dwModifiers;
    LPCWSTR szFilePath;
} PST_BINARYCHECKDATA, *PPST_BINARYCHECKDATA, *LPPST_BINARYCHECKDATA;
```

Members
cbSize
The count of bytes in this data structure. It should be set to sizeof(PST_BINARYCHECKDATA).

dwModifiers
Determines what calling code can have access to the protected data.

Currently defined values for dwModifiers determine which one of a chain of callers must be verified, and are shown in the following table. Use, at most, one of this group of modifiers — they should not be logically ORed.

> dwModifiers
> PST_AC_SINGLE_CALLER
> PST_AC_TOP_LEVEL_CALLER
> PST_AC_IMMEDIATE_CALLER In order to get the best security, it is recommended that the application use the most specific modifier that applies. If possible, use the default, which is PST_AC_SINGLE_CALLER.

PST_AC_SINGLE_CALLER

> Use this modifier when there is only a single level in the call chain to PStore, the executable, and there are no intermediate DLLs called. To gain access to the protected data, the caller must pass the verification check. This is the default modifier, so if zero is used for dwModifiers, the same result will be achieved. This modifier achieves the highest level of security.

PST_AC_TOP_LEVEL_CALLER

> Use this modifier when the protected data is to be accessed by a given executable but calls may go through other DLLs; as might be the case when an application must access the data through various DLLs, depending on settings within the application. In this case, the top level caller (executable) will be verified, but the intermediate DLLs will not.

PST_AC_IMMEDIATE_CALLER

> Use this modifier when the protected data is to be accessed by a given DLL that may be called by various executables. In this case, the immediate caller (DLL) will be verified, but any other intermediate DLLs and the executable will not.

szFilePath

> Specifies the file that contains the binary check data to be used in the check of an Access Clause. The path specified should be the full path to the file. The file path can be obtained from the GetModuleFileName. (For more information, search the Microsoft Platform SDK for the function GetModuleFileName.) Note that the path must be in UNICODE format so Microsoft Windows 95 users can call GetModuleFileNameA to get the ANSI version of the path. It can then be converted to UNICODE by calling MultiByteToWideChar. Windows NT users do the same as the Windows 95 users, or they can just call GetModuleFileNameW, which returns the UNICODE path.

When the dwModifier specified is PST_AC_SINGLE_CALLER or PST_AC_TOP_LEVEL_CALLER, a NULL may be passed for szFilePath and the appropriate szFilePath will be determined when the structure is initialized and stored.

See Also
PST_ACCESSCLAUSE

PST_PROMPTINFO

The PST_PROMPTINFO data structure is passed in API calls where a User Alert dialog box may be generated, and the application developer wants to add prompt information to that dialog box. Note that a dialog box is not necessarily displayed when an API call is made. For example, if the protected data item has been opened with OpenItem then accesses are automatically granted without need for a User Alert until CloseItem is called.

```
typedef struct PST_PROMPTINFO {
    DWORD cbSize;
    DWORD dwPromptFlags;
    HWND hwndApp;
    LPCWSTR szPrompt;
} PST_PROMPTINFO, *PPST_PROMPTINFO;
```

Members
cbSize
   The count of bytes in this data structure. It should be set to sizeof(PST_PROMPTINFO).
dwPromptFlags
   These flags specify the behavior of the how prompts are presented to the user.
   Currently defined prompt flags are shown in the following table.

DwPromptFlags
   PST_PF_ALWAYS_SHOW

PST_PF_ALWAYS_SHOW specifies that the application requests that the User Alert dialog box be shown always, even when the password is currently cached, or the PStore Provider default has been set to "silent."

hwndApp
   Specifies where the user alert dialog box appears on the screen. It must be passed for correct modality on dialogs. NULL may be passed to indicate that the desktop is the parent.
szPrompt
   The prompt string to be displayed in the dialog box.

See Also
IPStore::DeleteItem, IPStore::OpenItem, IPStore::ReadItem, IPStore::WriteItem

PST_PROVIDERINFO

A structure returned by the GetInfo method of IPStore and by the Next method of IEnumPStoreProviders. It contains information about the provider's identifier, capabilities supported, and its friendly name.

```
typedef struct PST_PROVIDERINFO {
```

```
    DWORD cbSize;
    PST_PROVIDERID ID;
    PST_PROVIDERCAPABILITIES Capabilities;
    LPWSTR szProviderName,
} PST_PROVIDERINFO, *PPST_PROVIDERINFO;
```

Members
cbSize
  The count of bytes in this data structure. It should be set to sizeof(PST_PROVIDERINFO).
ID
  Specifies the globally unique identifier (GUID) for this provider.
Capabilities
  Specifies the capabilities supported by this provider.
  Currently defined provider capabilities are shown in the following table.
   Flags
   PST_PC_HARDWARE
   PST_PC_MULITPLE_REPOSITORIES
   PST_PC_PCMCIA
   PST_PC_PFX
   PST_PC_ROAMABLE
   PST_PC_SMARTCARD szProviderName
  A string specifying the friendly name of the provider.

See Also
IPStore::GetInfo, IEnumPStoreProviders::Next

PST_TYPEINFO

An extensible structure used when creating a type. It allows future types to be defined that contain extra data associated with the type. For instance, an icon could be associated with the type.

```
typedef struct PST_TYPEINFO {
    DWORD cbSize;
    LPCWSTR szDisplayName;
} PST_TYPEINFO, *PPST_TYPEINFO;
```

Members
cbSize
  The count of bytes in this data structure. It should be set to sizeof(PST_TYPEINFO).
szDisplayName
  A string specifying the friendly name of the Type.

See Also
IPStore::CreateSubtype, IPStore::CreateType, IPStore::GetSubtypeInfo, IPStore::GetTypeInfo

What is claimed is:

1. A method of controlling access to objects, comprising the following steps:

accepting one or more predetermined evaluation-criteria values for an application program, such values having been determined by evaluating the application program itself;

accepting a request for object access from the application program, wherein such request is accepted separately from the predetermined evaluation-criteria values;

re-evaluating, upon accepting the request, one or more present evaluation-criteria values of one or more properties of the requesting application program, such properties having values determined by re-evaluating the requesting application program itself;

allowing object data access only to the requesting application program if the one or more evaluated properties have one or more of the present evaluation-criteria values that comply with one or more of the predetermined evaluation-criteria values.

2. A method as recited in claim 1, wherein at least some of the evaluated properties are specified by authentication certificates associated with the application program.

3. A method as recited in claim 1, wherein the evaluated properties comprise a program publisher property and a program name property.

4. A method as recited in claim 1, wherein the evaluated properties are selected from a group of properties consisting of a program publisher property and a program name property.

5. A method as recited in claim 1, wherein the requesting application program has authentication certificates that specify the evaluated properties, the evaluated properties comprising a certificate issuer property, a certificate root property, a program publisher property, and a program name property.

6. A method as recited in claim 1, wherein the requesting application program has authentication certificates that specify the evaluated properties, the evaluated properties being selected from a group of properties consisting of a certificate issuer property, a certificate root property, a program publisher property, and a program name property.

7. A method as recited in claim 1, wherein the evaluated properties comprise hash values of binary images of the requesting application program.

8. A system for protecting data items from unauthorized access, comprising:

a storage server being configured to:
  receive data items from an application program;
  return such data items in response to a request from the application program; and
  receive predetermined evaluation-criteria values of evaluated properties of the application program separately from a data-item request, such values having been determined by evaluating the application program itself;

the storage server being further configured to evaluate one or more properties of the requesting application program;

the storage server being still further configured to return requested data items only to the requesting application program if the evaluated properties having present evaluation-criteria values that correspond to predetermined evaluation-criteria values.

9. A system as recited in claim 8, wherein at least some of the evaluated properties are specified by authentication certificates associated with the application program.

10. A system as recited in claim 8, wherein the evaluated properties comprise a program publisher property and a program name property.

11. A system as recited in claim 8, wherein the evaluated properties are selected from a group of properties consisting of a program publisher property and a program name property.

12. A system as recited in claim 8, wherein the requesting application program has authentication certificates that specify the evaluated properties, the evaluated properties comprising a certificate issuer property, a certificate root property, a program publisher property, and a program name property.

13. A system as recited in claim 8, wherein the requesting application program has authentication certificates that specify the evaluated properties, the evaluated properties being selected from a group of properties consisting of a certificate issuer property, a certificate root property, a program publisher property, and a program name property.

14. A system as recited in claim 8, wherein the evaluated properties comprise hash values of binary images of the requesting application program.

15. A system for storing data items and for protecting them from unauthorized access, comprising:

a storage server configured to receive data items from an application program and to return such data items in response to a request from the application program, wherein the application program is associated with one or more users and the storage server executes in a different address space than the application program and is called via remote procedure calls;

a storage provider configured to be called by the storage server to securely store and retrieve the data items, wherein the storage provider encrypts data items before storing them using one or more keys that are derived from authentication of the current computer user, the storage provider verifying the integrity of data items when retrieving them;

an authentication provider configured to be called by the storage server to identify one or more current computer users, wherein the authentication provider identifies users based on a previous operating system logon procedure;

the storage server being configured to evaluate one or more present properties of the requesting application program and to evaluate one or more properties of one or more associated users of the requesting application program;

the storage server being further configured to return requested data items only to the requesting application program if:
  the present evaluated properties comply with predetermined values; and
  the one or more associated users have evaluated properties which comply with the predetermined values.

16. A computer-readable storage medium having instructions that are executable by a computer to perform steps comprising:

accepting a request for data from an application program, wherein the application program is associated with one or more users;

evaluating one or more present properties of the requesting application program, said evaluated properties being obtained from one or more image files of the requesting application program;

evaluating one or more properties of the one or more associated users of the requesting application program;

returning requested data only to the application program if the evaluated present properties comply with predetermined values and only to the application program if the one or more associated users have evaluated properties which comply with the predetermined values.

17. A computer-readable storage medium as recited in claim 16, wherein at least some of the evaluated properties are specified by authentication certificates associated with the application program.

18. A computer-readable storage medium as recited in claim 16, wherein the evaluated properties comprise a program publisher property and a program name property.

19. A computer-readable storage medium as recited in claim 16, wherein the evaluated properties are selected from a group of properties consisting of a program publisher property and a program name property.

20. A computer-readable storage medium as recited in claim 16, wherein the requesting application program has authentication certificates that specify the evaluated properties, the evaluated properties comprising a certificate issuer property, a certificate root property, a program publisher property, and a program name property.

21. A computer-readable storage medium as recited in claim 16, wherein the requesting application program has authentication certificates that specify the evaluated properties, the evaluated properties being selected from a group of properties consisting of a certificate issuer property, a certificate root property, a program publisher property, and a program name property.

22. A computer-readable storage medium as recited in claim 16, wherein the evaluated properties comprise hash values of the one or more files.

23. A method of controlling access to objects, comprising the following steps:
receiving data;
encrypting received data into objects;
accepting one or more predetermined evaluation-criteria values for an application program, such values having been determined by evaluating the application program itself;
accepting a request for object access from the requesting application program, wherein such request is accepted separately from the predetermined evaluation-criteria values;
re-evaluating, upon acceptance of the request, one or more present evaluation-criteria values of one or more properties of the requesting application program, such properties having values determined by re-evaluating the requesting application program itself;
decrypting object data and allowing object data access only to the requesting application program if the one or more evaluated properties have one or more of the present evaluation-criteria values that comply with one or more of the predetermined evaluation-criteria values.

24. A method of claim 23, wherein the application program is associated with one or more users, the method further comprising:
evaluating one or more properties of associated users of the requesting application program;
the decrypting and allowing access steps being limited to only the application program if one or more associated users have evaluated properties which comply with the predetermined evaluation-criteria values.

25. A method of claim 23, wherein the application program is completely incapable of decrypting object data itself after such data has been encrypted, with or without a decryption key.

26. A method of controlling access to objects, comprising the following steps:
accepting a request for object access from an application program, wherein the application program is associated with one or more users;
evaluating one or more properties of the requesting application program, such evaluated properties being based upon one or more inherent characteristics of the application program;
evaluating one or more properties of one or more associated users of the requesting application program;
allowing object data access only to the application program if:
the present evaluated properties have predetermined values; and
the one or more associated users have evaluated properties of predetermined values.

27. A method as recited in claim 26, wherein at least some of the evaluated properties of the application program are specified by authentication certificates associated with the application program.

28. A method as recited in claim 26, wherein the evaluated properties of the application program comprise a program publisher property and a program name property.

29. A method as recited in claim 26, wherein the evaluated properties of the application program are selected from a group of properties consisting of a program publisher property and a program name property.

30. A method as recited in claim 26, wherein the requesting application program has authentication certificates that specify the evaluated properties, the evaluated properties comprising a certificate issuer property, a certificate root property, a program publisher property, and a program name property.

31. A method as recited in claim 26, wherein the requesting application program has authentication certificates that specify the evaluated properties, the evaluated properties being selected from a group of properties consisting of a certificate issuer property, a certificate root property, a program publisher property, and a program name property.

32. A method as recited in claim 26, wherein the evaluated properties of the application program comprise hash values of binary images of the requesting application program.

33. A method as recited in claim 26, wherein the evaluated properties of the user comprise one or more authentication codes.

34. A method as recited in claim 26, wherein the data of the object is encrypted, further comprising decrypting the object to allow access to data of the object.

35. A system for protecting data items from unauthorized access, comprising:
a storage server that receives data items from an application program and that returns such data items in response to a request from the application program, wherein the application program is associated with one or more users;
the storage server being configured to evaluate one or more properties of the requesting application program and to evaluate one or more properties of associated users of the requesting application program, such evaluated properties of the requesting application program being based upon one or more inherent characteristics of the application program;
the storage server being further configured to return requested data items only to the requesting application program if:

the present evaluated properties have predetermined values; and the one or more associated users have evaluated properties of predetermined values.

36. A system as recited in claim 35, wherein at least some of the evaluated properties of the requesting application program are specified by authentication certificates associated with the application program.

37. A system as recited in claim 35, wherein the evaluated properties of the requesting application program comprise a program publisher property and a program name property.

38. A system as recited in claim 35, wherein the evaluated properties of the requesting application program are selected from a group of properties consisting of a program publisher property and a program name property.

39. A system as recited in claim 35, wherein the requesting application program has authentication certificates that specify the evaluated properties, the evaluated properties comprising a certificate issuer property, a certificate root property, a program publisher property, and a program name property.

40. A system as recited in claim 35, wherein the requesting application program has authentication certificates that specify the evaluated properties, the evaluated properties being selected from a group of properties consisting of a certificate issuer property, a certificate root property, a program publisher property, and a program name property.

41. A system as recited in claim 35, wherein the evaluated properties of the requesting application program comprise hash values of binary images of the requesting application program.

42. A system as recited in claim 35, wherein the evaluated properties of the user comprise one or more authentication codes.

43. A system as recited in claim 35, wherein data of the data item is encrypted, further comprising decrypting the data item to allow access to data of the data item.

44. A method of controlling access to objects, comprising:

accepting one or more predetermined evaluation-criteria values for an application program, such values having been determined by evaluating the application program itself, as a whole;

accepting a request for object access from the requesting application program, wherein such request is accepted separately from the predetermined evaluation-criteria values;

re-evaluating, upon accepting the request, one or more present evaluation-criteria values of one or more properties of the requesting application program, such properties having values determined by re-evaluating the requesting application program itself;

allowing object data access only to the requesting application program if the requesting application program has one or more evaluated properties having one or more of the present evaluation-criteria values that comply with one or more of the predetermined evaluation-criteria values.

45. A method of controlling access to objects, wherein a requesting application program has one or more predetermined evaluation-criteria values, such values having been determined by evaluating The application program itself, the method comprising:

obtaining a request for object access from the requesting application program, wherein such request lacks evaluation-criteria values;

evaluating, upon obtaining of the request, one or more present evaluation-criteria values of one or more properties of the requesting application program, such properties having values determined by evaluating the requesting application program itself;

allowing object data access only to the requesting application program if one or more evaluated properties have one or more of the present evaluation-criteria values that comply with one or more of the predetermined evaluation-criteria values.

46. A method of controlling access to objects, wherein a requester has one or more evaluation-criteria values which have been determined by an evaluation of the requester itself, the method comprising:

obtaining a request for object access from a requester;

evaluating, upon obtainment the request, one or more present evaluation-criteria values of one or more properties of the requester, such properties having values determined by evaluating the requester itself;

allowing object data access to the requester if one or more properties of the one or more of the present evaluation-criteria values comply with one or more predetermined evaluation-criteria values.

47. A method of controlling access to objects, wherein a requester has one or more inherent characteristics which have been be determined by an evaluation the requester itself, the method comprising:

obtaining a request for object access from a requester;

determining, upon obtainment the request one or more present inherent characteristics of the requester by evaluating the requester itself;

allowing object data access to the requester if the one or more present inherent characteristics comply with one or more of predetermined inherent characteristics.

48. A method as recited in claim 47, wherein at least some of the inherent characteristics are specified by authentication certificates associated with the application program.

49. A method as recited in claim 47, wherein the inherent characteristics comprise a program publisher property and a program name property.

50. A method as recited in claim 47, wherein the inherent characteristics are selected from a group of properties consisting of a program publisher property and a program name property.

51. A method as recited in claim 47, wherein the requesting application program has authentication certificates that specify the inherent characteristics, the evaluated properties comprising a certificate issuer property, a certificate root property, a program publisher property, and a program name property.

52. A method as recited in claim 47, wherein the requesting application program has authentication certificates that specify the inherent characteristics, the evaluated properties being selected from a group of properties consisting of a certificate issuer property, a certificate root property, a program publisher property, and a program name property.

53. A method as recited in claim 47, wherein the inherent characteristics comprise hash values of binary images of the requesting application program.

* * * * *